United States Patent
Wakizaka et al.

(10) Patent No.: US 8,691,330 B2
(45) Date of Patent: Apr. 8, 2014

(54) OPTICAL FILM HAVING ANTISTATIC LAYER, ANTIREFLECTION FILM, POLARIZING PLATE AND IMAGE DISPLAY DEVICE

(75) Inventors: Daiki Wakizaka, Kanagawa (JP); Takayasu Yamazaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 13/200,646

(22) Filed: Sep. 28, 2011

(65) Prior Publication Data

US 2012/0075706 A1 Mar. 29, 2012

(30) Foreign Application Priority Data

Sep. 29, 2010 (JP) ................. 2010-220084

(51) Int. Cl.
*B05D 5/06* (2006.01)

(52) U.S. Cl.
USPC ........................................ 427/162; 427/164

(58) Field of Classification Search
None
See application file for complete search history.

(56) References Cited

U.S. PATENT DOCUMENTS

| | | | |
|---|---|---|---|
| 2008/0241554 A1 | 10/2008 | Tanaka | |
| 2009/0081447 A1 * | 3/2009 | Wakizaka et al. | 428/323 |

FOREIGN PATENT DOCUMENTS

| | | |
|---|---|---|
| JP | 06-073305 A | 3/1994 |
| JP | 2004-091618 A | 3/2004 |
| JP | 2004-160274 A | 6/2004 |
| JP | 2005-054100 A | 3/2005 |
| JP | 2005-196122 A | 7/2005 |
| JP | 2005-199707 A | 7/2005 |
| JP | 2005-316428 A | 11/2005 |
| JP | 2006-075698 A | 3/2006 |
| JP | 2006-077113 A | 3/2006 |
| JP | 2006-176681 A | 7/2006 |
| JP | 2007-249217 A | 9/2007 |
| JP | 2008-239724 A | 10/2008 |
| JP | 2010-173234 A | 8/2010 |
| JP | 2010-174201 A | 8/2010 |
| WO | WO-03/055950 A1 | 7/2003 |
| WO | WO-2010/049503 A1 | 5/2010 |

OTHER PUBLICATIONS

Notification of Reasons for Refusal issued by JPO on Nov. 19, 2013, in connection with corresponding Japanese Patent Application No. 2010-220084.

* cited by examiner

*Primary Examiner* — Sheeba Ahmed
(74) *Attorney, Agent, or Firm* — Jean C. Edwards, Esq.; Edwards Neils PLLC

(57) ABSTRACT

An optical film having a transparent support having thereon at least a hardcoat layer and an antistatic layer in this order, wherein the hardcoat layer and the antistatic layer are formed by simultaneously coating compositions for forming respective layers, the antistatic layer comprises at least (A) an electrically conductive organic compound and (B) a polyfunctional monomer having three or more polymerizable groups, a content of an inorganic oxide fine particle in the antistatic layer is less than 10 weight % based on an entire solid content of the antistatic layer, and a common logarithmic value (LogSR) of surface resistivity SR ($\Omega$/sq) on the antistatic layer side with respect to the transparent support is 13 or less.

11 Claims, No Drawings

OPTICAL FILM HAVING ANTISTATIC LAYER, ANTIREFLECTION FILM, POLARIZING PLATE AND IMAGE DISPLAY DEVICE

CROSS-REFERENCE TO RELATED APPLICATION(S)

The present application claims priority from Japanese Patent Application No. 2010-220084 filed on Sep. 29, 2010, the entire content of which is incorporated herein by reference.

BACKGROUND

1. Field

The present invention relates to an optical film having an antistatic layer, an antireflection film, a polarizing plate using the film, and an image display device using the film or polarizing plate on the outermost surface of the display.

2. Description of the Related Art

In the fields of optics, precision machines, building materials, home electronics and the like, lamination of an optical film having an antistatic ability is useful for the purpose of preventing, for example, dust collection or an electric circuit failure. Above all, in the field of home electronics, from the standpoint of dust protection or a countermeasure against a failure during panel fabrication, an antistatic property is required of the protective film applied to an image display device such as cathode ray tube display device (CRT), plasma display panel (PDP), electroluminescent display (ELD) and liquid crystal display device (LCD).

In addition to the antistatic property, various functions such as glare prevention, antireflection, hardcoat performance, scratch resistance and antifouling property are sometimes required of the protective film of the above-described image display device, and it is important to satisfy these functions all at the same time.

As for the method to impart an antistatic performance to an optical film used in an image display device, an antireflection film having a layer where electrically conductive inorganic metal oxide particles are dispersed in an organic binder has been conventionally known (see, JP-A-2005-196122 (the term "JP-A" as used herein means an "unexamined published Japanese patent application"), JP-A-2006-77113 and JP-A-2006-75698). However, the refractive index of an electrically conductive particle conventionally used in general is as high as approximately from 1.6 to 2.2 and therefore, when an inorganic metal oxide particle is used in an optical film, the refractive index of the layer containing such a particle is increased. The increase in the refractive index of the layer may allow for occurrence of unintended interference unevenness due to a difference in the refractive index from an adjacent layer or may cause a problem such as intensification of reflection tint when an antireflection layer is provided thereon.

In recent years, with the progress of clearing technique (reduction in haze) to suppress whitening due to light scattering on the surface, the optical film for display is increasingly required to cope with interference unevenness or reflection tint. Particularly, in a film where the reflectance is decreased by providing an antireflection layer, the interference unevenness becomes easily visible and therefore, it is more important to satisfy the requirement above.

On the other hand, an electrically conductive organic compound is known as an electrically conductive material replacing the inorganic oxide particle. For example, a coating film composed of a curable binder and, as an electrically conductive organic compound, a polythiophene containing a polyanion that is an electron-conducting compound, is disclosed (Patent JP-A-2004-91618 and JP-A-2006-176681).

It is also disclosed to use, as an electrically conductive organic compound, a quaternary ammonium salt group-containing compound that is an ion-conducting compound (Patent Documents JP-A-2005-54100 and JP-A-2005-316428).

However, the optical film not using an inorganic metal oxide particle with high refractive index but using the above-described electrically conductive polymer still falls short of satisfying all levels of the hardcoat property, transmittance, coating film surface shape, interference unevenness and cost.

Meanwhile, as a technique to improve the interference unevenness due to a refractive index difference from an adjacent layer, a method of suppressing the interfacial reflection by using a solvent capable of swelling or dissolving the substrate has been disclosed (JP-A-2007-249217).

SUMMARY

In the case of using an electrically conductive organic compound in a hardcoat layer, when the film thickness of the antistatic layer is increased while keeping the electrically conductive organic compound content in the layer constant so as to obtain a high hardcoat property, the total amount of the electrically conductive organic compound in the layer is increased and this tends to cause intensification of coloring, reduction in the transmittance, or roughening of the coating film surface to produce fine irregularities. Also, when the film thickness is increased, the electrically conductive organic compound present in the lower part of the layer cannot contribute to the effect of decreasing the surface resistance, and a large amount of the electrically conductive organic compound is wastefully used, leading to a rise in the cost.

Furthermore, when a solvent capable of swelling or dissolving the substrate is used with an attempt to suppress the interference unevenness while using an electrically conductive polymer so as to impart an antistatic performance, the interference unevenness may be improved, but the coating film surface is roughened to produce fine irregularities or a large number of surface failures such as defects may be produced. Thus, it has not been achieved to satisfy all of the above-described performances at the same time.

The present invention has been made under these circumstances, and an object of the present invention is to provide an optical film having an antistatic layer endowed with high coat strength and excellent in the hardcoat property, transparency and antistatic property. Another object of the present invention is to provide an antireflection film ensuring little reflection tint when an antireflection layer is stacked on the antistatic layer above.

Means for Solving the Problems

As a result of intensive studies to solve those problems, the present inventors have been found that the problems can be solved and the objects above can be attained by satisfying the following requirements. The present invention has been accomplished based on this finding.

1. An optical film having a transparent support having thereon at least a hardcoat layer and an antistatic layer in this order, wherein the hardcoat layer and the antistatic layer are formed by simultaneously coating compositions for forming respective layers, the antistatic layer comprises at least (A) an electrically conductive organic compound and (B) a polyfunctional monomer having three or more polymerizable groups, a content of an inorganic oxide fine particle in the antistatic layer is less than 10 weight % based on an entire solid content of the antistatic layer, and a common logarithmic value (LogSR) of surface resistivity SR (Ω/sq) on the antistatic layer side with respect to the transparent support is 13 or less.

2. The optical film according to (1), wherein the hardcoat layer has at least (C) a polyfunctional monomer having two or more polymerizable groups and (D) a solvent capable of dissolving or swelling the transparent support.

3. The optical film according to (1), wherein Δn is from 0 to 0.02, and Δn represents a refractive index difference between the hardcoat layer and the antistatic layer.

4. The optical film according to (2), wherein the (D) solvent capable of dissolving or swelling the transparent support is at least one selected from the group consisting of methyl ethyl ketone, acetone, methyl acetate, and a carbonate solvent represented by the following formula (d1):

In formula (d1), each of Ra and Rb independently represents an alkyl group.

5. The optical film according to (2), wherein the (D) solvent capable of dissolving or swelling the transparent support is at least one selected from the group consisting of acetone, methyl acetate, dimethyl carbonate and diethyl carbonate.

6. The optical film according to (2), wherein a content of the (D) solvent capable of dissolving or swelling the transparent support is 20 to 100 weight % based on all solvents contained in the composition for forming said hardcoat layer.

7. The optical film according to (1), wherein the composition for forming the antistatic layer further contains (E) an alcohol-based solvent in a ratio of 20 to 80 weight % based on all solvents contained in the composition for forming the antistatic layer.

8. The optical film according to (1), wherein the composition for forming the hardcoat layer further contains (F) an inorganic oxide fine particle.

9. The optical film according to (8), wherein the (F) inorganic oxide fine particle is a silica fine particle.

10. The optical film according to (1), wherein at least either one of the composition for forming the hardcoat layer and the composition for forming the antistatic layer further contains (G) a thickener.

11. The optical film according to (1), wherein at least either one of the (B) and (C) contains at least one of an urethane acrylate and an epoxy acrylate.

12. The optical film according to (11), wherein at least either one of the (B) and (C) contains at least one of a monofunctional monomer/oligomer having a molecular weight of 600 or more and a polyfunctional monomer/oligomer.

13. The optical film according to (1), wherein the composition for forming the antistatic layer further contains a fluorine-containing surfactant or a silicone-containing surfactant.

14. An antireflection film having a low refractive index layer on the optical film according to (1), directly or through another layer.

15. A polarizing plate using the optical film according to (1), as a polarizing plate protective film.

16. An image display device having the optical film according to (1), on the outermost surface of the display.

17. An image display device having the antireflection film according to (14), on the outermost surface of the display.

18. An image display device having the polarizing plate according to (15), on the outermost surface of the display.

19. A method for producing an optical film having a transparent support having thereon at least a hardcoat layer and an antistatic layer in this order, with the common logarithmic value (LogSR) of the surface resistivity SR (Ω/sq) on the antistatic layer side with respect to said transparent support being 13 or less, including: simultaneously coating: an antistatic layer-forming composition containing at least (A) an electrically conductive organic compound and (B) a polyfunctional monomer having three or more polyinerizable groups and having an inorganic oxide fine particle content of less than 10 weight % based on the entire solid content; and a hardcoat layer-forming composition.

The optical film of the present invention has a configuration where at least a hardcoat layer and an antistatic layer are stacked in this order on a transparent support. In the present invention, the two layers of hardcoat layer and antistatic layer are formed by a method of simultaneously coating and forming two coated layers in one coating step (simultaneous multilayer coating).

In the case of using an electrically conductive organic compound in a hardcoat layer, when the film thickness of the antistatic layer is increased while keeping the electrically conductive organic compound content in the layer constant so as to obtain a high hardcoat property, the total amount of the electrically conductive organic compound in the layer is increased and this tends to cause intensification of coloring, reduction in the transmittance, or roughening of the coating film surface to produce fine irregularities. Also, when the film thickness is increased, the electrically conductive organic compound present in the lower part of the layer cannot contribute to the effect of decreasing the surface resistance, and a large amount of the electrically conductive organic compound is wastefully used, leading to a rise in the cost. Therefore, as described above, a two-layer configuration consisting of a hardcoat layer (antiglare layer) and an antistatic layer containing an electrically conductive organic compound in a high density is fabricated, whereby an optical film satisfying all of hardcoat property, electrical conductivity, transmittance, good surface shape and low cost is obtained.

Also, for obtaining an optical film improved in the interference unevenness, it is important to use a solvent capable of dissolving or swelling the substrate and thereby suppress interfacial reflection, and in the case of forming an antistatic layer by using an electrically conductive organic compound, when the above-described solvent is used in combination, although the interference unevenness is improved, surface roughening or a point defect is sometimes generated, because many electrically conductive organic compounds are a hydrophilic compound. Similarly, in the case where a solvent (alcohol-based solvent) allowing for high solubility and stability of an electrically organic compound is used in the antistatic layer, although surface roughening or whitening is less likely to occur, but the interference unevenness tends to become bad. Therefore, as described above, a two-layer configuration consisting of a hardcoat layer (antiglare layer) and an antistatic layer containing an electrically conductive organic compound in a high density is fabricated, and the solvent species and the like in each layer are controlled, whereby an optical film satisfying all of improved interference unevenness, high hardcoat property, high electrical conductivity, high transmittance and good surface shape is obtained.

The two layers of hardcoat layer and antistatic layer are simultaneously coated and formed in one coating step, whereby the hardcoat layer/antistatic layer interface is appropriately mixed, which leads to excellent interfacial adherence and improved interference unevenness due to reduction in the interfacial reflection and enables low-cost production and high productivity.

According to the present invention, an optical film and an antireflection film each having high coat strength and being excellent in the hardcoat property, transparency and antistatic property, a polarizing plate using the film, and an image display device can be provided. Also, the present invention can provide an optical film ensuring, in addition to the effects above, that optical unevenness due to interference fringe is hardly observed.

DETAILED DESCRIPTION OF THE INVENTION

The mode for carrying out the present invention is described in detail below, but the present invention is not limited thereto. Incidentally, the expression "from (numerical value 1) to (numerical value 2)" as used in the description of the present invention for indicating a physical value, a characteristic value or the like means "(numerical value 1) or more and (numerical value 2) or less". Also, the term "(meth) acrylate" as used in the description of the present invention means "at least either acrylate or methacrylate". The same applies to "(meth)acrylic acid", "(meth)acryloyl" and the like.

The optical film of the present invention is an optical film having a transparent support having thereon at least a hardcoat layer and an antistatic layer, these two layers being simultaneously coated and formed, wherein the antistatic layer is formed of a composition containing (A) and (B), the content of an inorganic oxide fine particle is from 0% to less than 10% based on the solid content, and the common logarithmic value (LogSR) of the surface resistivity SR (Ω/sq) is 13 or less:

(A) an electrically conductive organic compound, and
(B) a polyfunctional monomer having three or more polymerizable groups.

The configuration of the optical film of the present invention is described in detail below.

[Layer Configuration of Optical Film]

The optical film of the present invention has at least a hardcoat layer and an antistatic layer on a transparent support. Representative examples of the configuration of the optical film include the followings. Also, the optical film may have a functional layer other than those described below.

a. Transparent support/hardcoat layer/antistatic layer
b. Transparent support/hardcoat layer/antistatic layer/low refractive index layer
c. Transparent support/hardcoat layer/antistatic layer/high refractive index layer/low refractive index layer
d. Transparent support/hardcoat layer/antistatic layer/medium refractive index layer/high refractive index layer/low refractive index layer As in the configuration b, when a low refractive index layer is stacked after coating the hardcoat layer/antistatic layer on the support, the optical film can be suitably used as an antireflection film. By forming the low refractive index layer to a film thickness of around ¼ of the wavelength of light on the hardcoat layer/antistatic layer, surface reflection can be reduced on the principle of thin-film interference (hereinafter, out of the optical film of the present invention, particularly, an optical film having an antireflection layer (low refractive index layer, medium refractive index layer, high refractive index layer) on the hardcoat layer/antistatic layer is sometimes referred to as an "antireflection film").

Also, as in the configuration c, even when a high refractive index layer and a low refractive index layer are stacked after coating the hardcoat layer/antistatic layer on the support, the optical film can be suitably used as an antireflection film. Furthermore, as in the configuration d, when a layer configuration consisting of, in order, a medium refractive index layer, a high refractive index layer and a low refractive index layer is provided on the support and the hardcoat layer/antistatic layer, the reflectance can be reduced to 1% or less.

In the configurations a to d, the hardcoat layer and the antistatic layer can be formed as an antiglare layer having an antiglare property. The antiglare property may be imparted by a known method but can be suitably imparted by the dispersion of matting particles. The antiglare layer formed by the dispersion of matting particles is composed of a binder and light-transmitting particles dispersed in the binder.

The components which can be used in the composition for forming the antistatic layer (antistatic layer-forming composition) of the optical film of the present invention and the composition for forming the hardcoat layer (hardcoat layer-forming composition) are described below. In the present invention, the antistatic layer-forming composition and the hardcoat layer-forming composition are simultaneously coated and formed on a transparent support and therefore, these compositions are preferably a coating solution.

The antistatic layer-forming composition for use in the present invention contains at least the following (A) and (B):

(A) an electrically conductive organic compound, and
(B) a polyfunctional monomer having three or more polymerizable groups.

(A) Electrically Conductive Organic Compound

The antistatic layer-forming composition for use in the present invention contains an electrically conductive organic compound.

The electrically conductive organic compound for use in the present invention is not particularly limited as long as it is an organic compound having electrical conductivity. Examples of such a compound include an ion-conducting compound and an electron-conducting compound.

The ion-conducting compound includes ion-conducting compounds such as cationic, anionic, nonionic and amphoteric compounds. Among these, a quaternary ammonium salt group-containing compound (cationic compound) is preferred because of its high antistatic performance and relative inexpensiveness.

The quaternary ammonium salt group-containing compound used may be either a low molecular type or a polymer type, and among the both type, a polymer-type cationic antistatic agent is more preferably used, because the antistatic property does not fluctuate by bleed-out or the like.

The polymer-type quaternary ammonium salt group-containing cationic compound may be appropriately selected from known compounds and used. As such a compound, a polymer having at least one unit selected from the structural units represented by the following formulae (I) to (III) is preferred.

Formula (I):

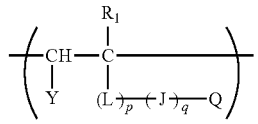

In formula (I), $R_1$ represents a hydrogen atom, an alkyl group, a halogen atom or —$CH_2COO^-M^+$, Y represents a hydrogen atom or —$COO^-M^+$, $M^+$ represents a proton or a cation, L represents —CONH—, —COO—, —CO— or —O—, J represents an alkylene group, an arylene group or a group obtained by combination thereof, and Q represents a group selected from the following group A:

A:

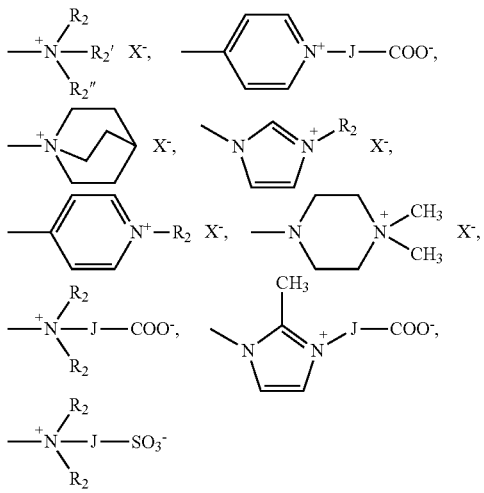

In the above formulae, each of $R_2$, $R_2'$ and $R_2''$ independently represents an alkyl group, J represents an alkylene group, an arylene group or a group obtained by combination thereof, $X^-$ represents an anion, and each of p and q independently represents 0 or 1.

Formula (II):

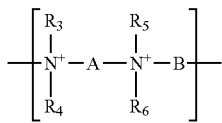

Formula (III):

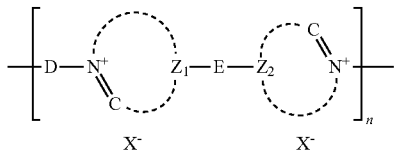

In formulae (II) and (III), each of $R_3$, $R_4$, $R_5$ and $R_6$ independently represents an alkyl group, each of a pair of $R_3$ and $R_4$ and a pair of $R_5$ and $R_6$ may combine together to form a nitrogen-containing heterocyclic ring.

Each of A, B and D independently represents an alkylene group, an arylene group, an alkenylene group, an arylenealkylene group, $—R_7COR_8—$, $—R_9COOR_{10}OCOR_{11}—$, $—R_{12}OCR_{13}COOR_{14}—$, $—R_{15}—(OR_6)_m—$, $—R_{17}CONHR_{18}NHCOR_{19}—$, $—R_{20}OCONHCR_{21}NHCOR_{22}—$ or $—R_{23}NHCONHR_{24}NHCONHR_{25}—$, E represents a single bond, an alkylene group, an arylene group, an alkenylene group, an arylenealkylene group, $—R_7COR_8—$, $—R_9COOR_{10}OCOR_{11}—$, $—R_{12}OCR_{13}COOR_{14}—$, $—R_{15}—(OR_{16})_m—$, $—R_{17}CONHR_{18}NHCOR_{19}—$, $—R_{20}OCONHR_{21}NHCOR_{22}—$, $—R_{23}NHCONHR_{24}NHCONHR_{25}—$ or $—NHCOR_{26}CONH—$, each of $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$ and $R_{26}$ represents an alkylene group, each of $R_{10}$, $R_{13}$, $R_{18}$, $R_{21}$ and $R_{24}$ independently represents a linking group selected from an alkylene group, an alkenylene group, an arylene group, an arylenealkylene group and an alkylenearylene group, m represents a positive integer of 1 to 4, $X^-$ represents an anion, and each of $Z_1$ and $Z_2$ represents a nonmetallic atom group necessary for forming a 5- or 6-membered ring together with the $—N=C—$ group and may combine with E in a quaternary salt form of $=N^+[X^-]—$.

n represents an integer of 5 to 300.

The groups of formulae (I) to (III) are described below.

The halogen atom includes a chlorine atom and a bromine atom and is preferably a chlorine atom.

The alkyl group is preferably a branched or linear alkyl group having a carbon number of 1 to 4, more preferably a methyl group, an ethyl group or a propyl group.

The alkylene group is preferably an alkylene group having a carbon atom of 1 to 12, more preferably a methylene group, an ethylene group or a propylene group, still more preferably an ethylene group.

The arylene group is preferably an arylene group having a carbon number of 6 to 15, more preferably a phenylene group, a diphenylene group, a phenylmethylene group, a phenyldimethylene group or a naphthylene group, still more preferably a phenylmethylene group. These groups may have a substituent.

The alkenylene group is preferably an alkenylene group having a carbon number of 2 to 10, and the arylenealkylene group is preferably an arylenealkylene group having a carbon number of 6 to 12. These groups may have a substituent.

Examples of the substituent which may be substituted on each group include a methyl group, an ethyl group and a propyl group.

In formula (I), $R_1$ is preferably a hydrogen atom.

Y is preferably a hydrogen atom.

J is preferably a phenylmethylene group.

Q is preferably a group represented by the following formula (VI) selected from the group A, wherein each of $R_2$, $R_2'$ and $R_2''$ is a methyl group.

$X^-$ includes, for example, a halogen ion, a sulfonate anion and a carboxylate anion and is preferably a halogen ion, more preferably a chlorine ion.

Each of p and q is preferably 0 or 1, and more preferably, p=0 and q=1.

Formula (VI):

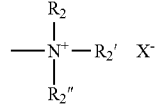

In formulae (II) and (III), each of $R_3$, $R_4$, $R_5$ and $R_6$ is preferably a substituted or unsubstituted alkyl group having a carbon number of 1 to 4, more preferably a methyl group or an ethyl group, still more preferably a methyl group.

Each of A, B and D is independently preferably a substituted or unsubstituted alkylene, arylene, alkenylene or arylenealkylene group having a carbon number of 2 to 10, more preferably a phenyldimethylene group.

$X^-$ includes, for example, a halogen ion, a sulfonate anion and a carboxylate anion and is preferably a halogen ion, more preferably a chlorine ion.

E is preferably a single bond, an alkylene group, an arylene group, an alkenylene group or an arylenealkylene group.

Examples of the 5- or 6-membered ring formed by $Z_1$ or $Z_2$ together with the $—N=C—$group include a diazoniabicyclooctane ring.

Specific examples of the compound having a structural unit represented by formulae (I) to (III) are illustrated below, but the present invention is not limited thereto. In specific examples, out of indices (m, x, y, r and actual numerical values), m indicates the number of repeating units in each unit, and each of x, y and r indicates the molar ratio of respective units.
IP-1
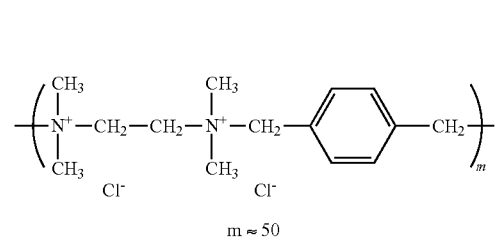
m ≈ 50
IP-2
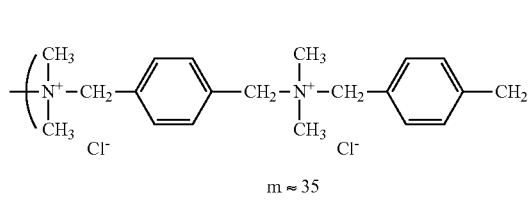
m ≈ 35
IP-3
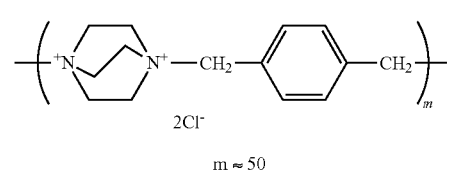
m ≈ 50
IP-4
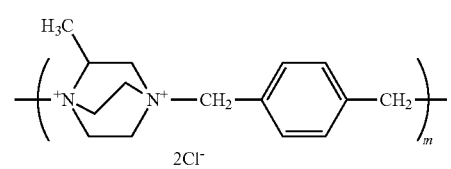
m ≈ 50
IP-5
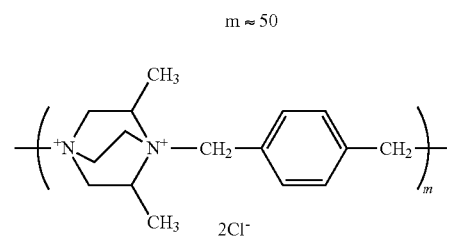
m ≈ 50
IP-6
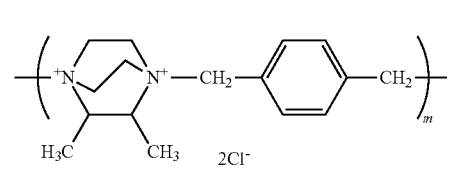
m ≈ 50
IP-7
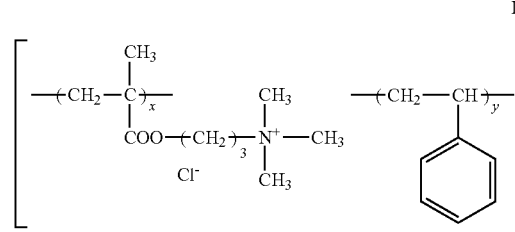
x:y = 60:40
m ≈ 80
-continued
IP-8
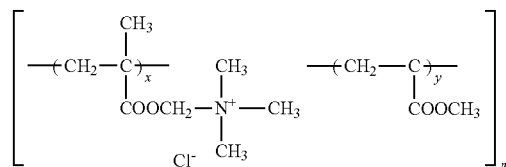
x:y = 70:30
m ≈ 80
IP-9
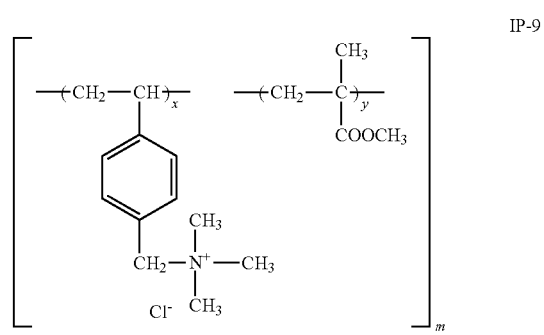
x:y = 50:50
m ≈ 80
IP-10
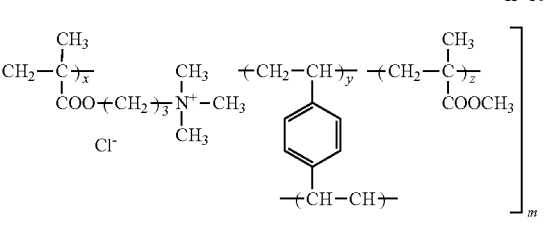
x:y:z = 50:4:46
m ≈ 80
IP-11
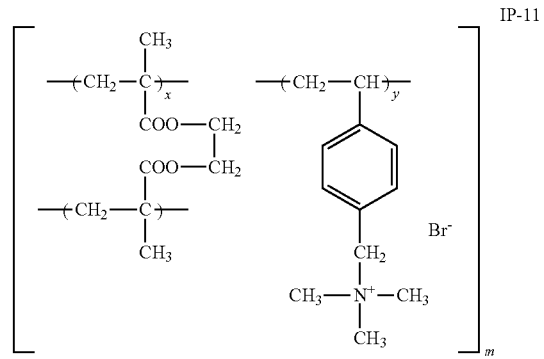
x:y = 5:95
m ≈ 60

IP-12

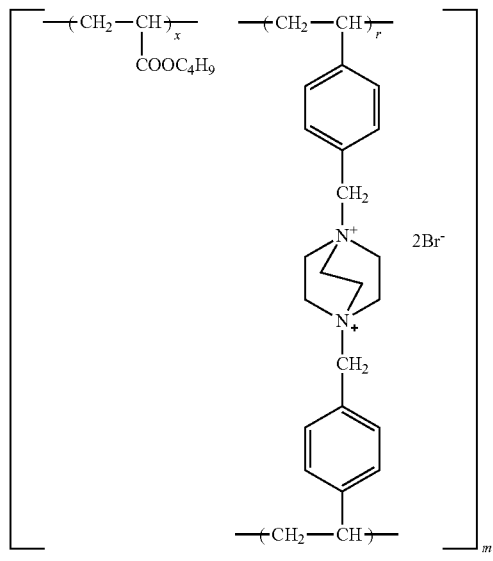

y:r = 7:93 m ≈ 30

IP-13

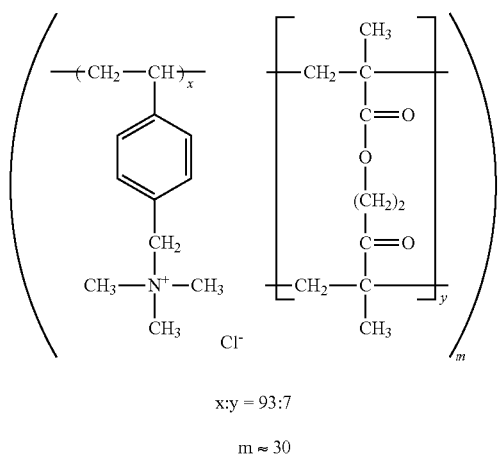

x:y = 93:7 m ≈ 30

One of the electrically conductive compounds illustrated above may be used alone, or two or more of these compounds may be used in combination. An antistatic compound having a polymerizable group in the molecule of the antistatic agent is more preferred, because the scratch resistance (film strength) of the antistatic layer can be also enhanced.

The content of the ion-conducting compound is preferably from 0.1 to 20 weight %, more preferably from 1 to 15 weight %, and most preferably from 3 to 10 weight %, based on the entire solid content in the coating composition for antistatic hardcoat layer. When the content is 0.1 weight % or more, a sufficient antistatic property is obtained, and when the content is 20 weight % or less, the coating film is kept from reduction in the hardness and can have an excellent surface shape.

The electrically conductive compound includes a compound that is a non-conjugated polymer or conjugated polymer obtained by linking aromatic carbocyclic rings or aromatic heterocyclic rings through a single bond or a divalent or higher valent linking group. The electrically conductive compound for use in the present invention is preferably a polymer exhibiting electrical conductivity of $10^{-6}$ S·cm$^{-1}$ or more, and any polymer may be used as long as it falls within this polymer compound. A polymer compound having an electrical conductivity of $10^{-1}$ S·cm$^{-1}$ or more (hereinafter, sometimes referred to as an "electrically conductive polymer") is more preferred.

The electrically conductive polymer is preferably a non-conjugated polymer or conjugated polymer in which aromatic carbocyclic rings or aromatic heterocyclic rings are linked by a single bond or a divalent or higher valent linking group. Examples of the aromatic carbocyclic ring in the non-conjugated polymer or conjugated polymer include a benzene ring, and the ring may further form a fused ring. Examples of the aromatic heterocyclic ring in the non-conjugated polymer or conjugated polymer include a pyridine ring, a pyrazine ring, a pyrimidine ring, a pyridazine ring, a triazine ring, an oxazole ring, a thiazole ring, an imidazole ring, an oxadiazole ring, a thiadiazole ring, a triazole ring, a tetrazole ring, a furan ring, a thiophene ring, a pyrrole ring, an indole ring, a carbazole ring, a benzimidazole ring and an imidazopyridine ring, and the ring may further form a fused ring or may have a substituent.

The divalent or higher valent linking group in the non-conjugated polymer or conjugated polymer includes a linking group formed, for example, by a carbon atom, a silicon atom, a nitrogen atom, a boron atom, an oxygen atom, a sulfur atom, a metal or a metal ion. The linking group is preferably a group formed by a carbon atom, a nitrogen atom, a silicon atom, a boron atom, an oxygen atom, a sulfur atom or a combination thereof. Examples of the group formed by a combination include a substituted or unsubstituted methylene group, a carbonyl group, an imino group, a sulfonyl group, a sulfinyl group, an ester group, an amide group, and a silyl group.

Specific examples of the electrically conductive polymer include substituted or unsubstituted electrically conductive polyaniline, polyparaphenylene, polyparaphenylene vinylene, polythiophene, polyfuran, polypyrrole, polyselenophene, polyisothianaphthene, polyphenylene sulfide, polyacetylene, polypyridyl vinylene, polyazine, and derivatives thereof. One of these polymers may be used alone, or two or more thereof may be used in combination according to the purpose.

Also, as long as the desired electrical conductivity can be obtained, the polymer may be used as a mixture with another polymer having no electrical conductivity, or a copolymer of a monomer capable of configuring an electrically conductive polymer and another monomer having no electrical conductivity may be used.

The electrically conductive polymer is more preferably a conjugated polymer. Examples of the conjugated polymer include polyacetylene, polydiacetylene, poly(paraphenylene), polyfluorene, polyazulene, poly(paraphenylene sulfide), polypyrrole, polythiophene, polyisothianaphthene, polyaniline, poly(paraphenylene vinylene), poly(2,5-thienylene vinylene), a double chain-type conjugated polymer (e.g., polyperinaphthalene), a metallophthalocyanine-based polymer, other conjugated polymers (e.g., poly(paraxylylene), poly[α-(5,5'-bithiophenediyl)benzylidene]), and derivatives thereof.

Among these, poly(paraphenylene), polypyrrole, polythiophene, polyaniline, poly(paraphenylene vinylene) and poly(2,5-thienylene vinylene) are preferred, polythiophene, polyaniline, polypyrrole and derivatives thereof are more preferred, and at least either polythiophene or a derivative thereof is still more preferred.

These conjugated polymers may have a substituent, and the substituent that is substituted on these conjugated polymers includes the substituent described as $R^{11}$ in formula (s1) later.

In particular, from the standpoint of obtaining an optical film satisfying both high transparency and antistatic property, the electrically conductive polymer preferably has a partial structure represented by the following formula (s1) (that is, polythiophene or a derivative thereof).

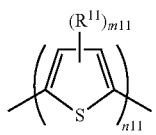

(s1)

In formula (s1), $R^{11}$ represents a substituent; m11 represents an integer of 0 to 2, and when m11 represents 2, the plurality of $R^{11}$'s may be the same or different and may combine with each other to form a ring; and $n^{11}$ represents an integer of 1 or more.

Examples of the substituent represented by $R^{11}$ include an alkyl group (preferably having a carbon number of 1 to 20, more preferably a carbon number of 1 to 12, still more preferably a carbon number of 1 to 8; e.g., methyl, ethyl, isopropyl, tert-butyl, n-octyl, n-decyl, n-hexadecyl, cyclopropyl, cyclopentyl, cyclohexyl), an alkenyl group (preferably having a carbon number of 2 to 20, more preferably a carbon number of 2 to 12, still more preferably a carbon number of 2 to 8; e.g., vinyl, allyl, 2-butenyl, 3-pentenyl, 2-hexenyl, 3-hexenyl, 4-hexenyl, 2-octenyl), an alkynyl group (preferably having a carbon number of 2 to 20, more preferably a carbon number of 2 to 12, still more preferably a carbon number of 2 to 8; e.g., propargyl, 3-pentynyl), an aryl group (preferably having a carbon number of 6 to 30, more preferably a carbon number of 6 to 20, still more preferably a carbon number of 6 to 12; e.g., phenyl, p-methylphenyl, naphthyl), an amino group (preferably having a carbon number of 0 to 20, more preferably a carbon number of 0 to 10, still more preferably a carbon number of 0 to 6; e.g., amino, methylamino, dimethylamino, diethylamino, dibenzylamino, diphenylamino), an alkoxy group (preferably having a carbon number of 1 to 20, more preferably a carbon number of 1 to 12, still more preferably a carbon number of 1 to 8; e.g., methoxy, ethoxy, butoxy, hexyloxy, octyloxy), an aryloxy group (preferably having a carbon number of 6 to 20, more preferably a carbon number of 6 to 16, still more preferably a carbon number of 6 to 12; e.g., phenyloxy, 2-naphthyloxy), an acyl group (preferably having a carbon number of 1 to 20, more preferably a carbon number of 1 to 16, still more preferably a carbon number of 1 to 12; e.g., acetyl, benzoyl, formyl, pivaloyl), an alkoxycarbonyl group (preferably having a carbon number of 2 to 20, more preferably a carbon number of 2 to 16, still more preferably a carbon number of 2 to 12; e.g., methoxycarbonyl, ethoxycarbonyl), an aryloxycarbonyl group (preferably having a carbon number of 7 to 20, more preferably a carbon number of 7 to 16, still more preferably a carbon number of 7 to 10; e.g., phenyloxycarbonyl), an acyloxy group (preferably having a carbon number of 2 to 20, more preferably a carbon number of 2 to 16, still more preferably a carbon number of 2 to 10; e.g., acetoxy, benzoyloxy), an acylamino group (preferably having a carbon number of 2 to 20, more preferably a carbon number of 2 to 16, still more preferably a carbon number of 2 to 10; e.g., acetylamino, benzoylamino), an alkoxycarbonylamino group (preferably having a carbon number of 2 to 20, more preferably a carbon number of 2 to 16, still more preferably a carbon number of 2 to 12; e.g., methoxycarbonylamino), an aryloxycarbonylamino group (preferably having a carbon number of 7 to 20, more preferably a carbon number of 7 to 16, still more preferably a carbon number of 7 to 12; e.g., phenyloxycarbonylamino), a sulfonylamino group (preferably having a carbon number of 1 to 20, more preferably a carbon number of 1 to 16, still more preferably a carbon number of 1 to 12; e.g., methanesulfonylamino, benzenesulfonylamino), a sulfamoyl group (preferably having a carbon number of 0 to 20, more preferably a carbon number of 0 to 16, still more preferably a carbon number of 0 to 12; e.g., sulfamoyl, methylsulfamoyl, dimethylsulfamoyl, phenylsulfamoyl), a carbamoyl group (preferably having a carbon number of 1 to 20, more preferably a carbon number of 1 to 16, still more preferably a carbon number of 1 to 12; e.g., carbamoyl, methylcarbamoyl, diethylcarbamoyl, phenylcarbamoyl), an alkylthio group (preferably having a carbon number of 1 to 20, more preferably a carbon number of 1 to 16, still more preferably a carbon number of 1 to 12; e.g., methylthio, ethylthio), an arylthio group (preferably having a carbon number of 6 to 20, more preferably a carbon number of 6 to 16, still more preferably a carbon number of 6 to 12; e.g., phenylthio), a sulfonyl group (preferably having a carbon number of 1 to 20, more preferably a carbon number of 1 to 16, still more preferably a carbon number of 1 to 12; e.g., mesyl, tosyl), a sulfinyl group (preferably having a carbon number of 1 to 20, more preferably a carbon number of 1 to 16, still more preferably a carbon number of 1 to 12; e.g., methanesulfinyl, benzenesulfinyl), a ureido group (preferably having a carbon number of 1 to 20, more preferably a carbon number of 1 to 16, still more preferably a carbon number of 1 to 12; e.g., ureido, methylureido, phenylureido), a phosphoric acid amide group (preferably having a carbon number of 1 to 20, more preferably a carbon number of 1 to 16, still more preferably a carbon number of 1 to 12; e.g., diethylphosphoric acid amide, phenylphosphoric acid amide), a hydroxy group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably having a carbon number of 1 to 20, more preferably a carbon number of 1 to 12; examples of the heteroatom include a nitrogen atom, an oxygen atom and a sulfur atom; specifically, for example, pyrrolidine, piperidine, piperazine, morpholine, thiophene, furan, pyrrole, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole and tetrazaindene), and a silyl group (preferably having a carbon number of 3 to 40, more preferably a carbon number of 3 to 30, still more preferably a carbon number of 3 to 24; e.g., trimethylsilyl, triphenylsilyl).

The substituent represented by $R^{11}$ may be further substituted. Also, in the case of having a plurality of substituents, these substituents may be the same or different and, if possible, may combine to form a ring. Examples of the ring formed include a cycloalkyl ring, a benzene ring, a thiophene ring, a dioxane ring, and a dithiane ring.

The substituent represented by $R^{11}$ is preferably an alkyl group, an alkenyl group, an alkynyl group, an alkoxy group or an alkylthio group, more preferably an alkyl group, an alkoxy group or an alkylthio group. In particular, when m11 is 2, two $R^{11}$'s are preferably alkoxy or alkylthio groups forming a ring and form a dioxane ring or a dithiane ring.

In formula (s1), when m11 is 1, $R^{11}$ is preferably an alkyl group, more preferably an alkyl group having a carbon number of 2 to 8.

Also, in the case of a poly(3-alkylthiophene) that is a polymer where $R^{11}$ is an alkyl group, the linkage mode between adjacent thiophene rings includes a sterically regular mode in which all rings are linked by a 2-5' linkage, and a sterically irregular mode containing a 2-2' linkage and a 5-5' linkage. A sterically irregular mode is preferred.

In the present invention, from the standpoint of satisfying both high transparency and high electrical conductivity, the electrically conductive polymer is still more preferably poly(3,4-ethylenedioxy)thiophene (PEDOT, Compound (6) in specific examples illustrated below).

The polythiophene represented by formula (s1) or a derivative thereof can be produced by a known method described, for example, in *J. Mater. Chem.*, 15, 2077-2088 (2005) and *Advanced Materials*, 12(7), page 481 (2000). Also, these are available as a commercial product such as Denatron P502 (produced by Nagase ChemteX Corporation), 3,4-ethylenedioxythiophene (BAYTRON (registered trademark) M V2), 3,4-polyethylenedioxythiopene/polystyrenesulfonate (BAYTRON (registered trademark) P), BAYTRON (registered trademark) C, BAYTRON (registered trademark) F E, BAYTRON (registered trademark) M V2, BAYTRON (registered trademark) P, BAYTRON (registered trademark) P AG, BAYTRON (registered trademark) P HC V4, BAYTRON (registered trademark) P HS, BAYTRON (registered trademark) PH, BAYTRON (registered trademark) PH 500, and BAYTRON (registered trademark) PH 510 (all produced by H.C. Starck GmbH).

As to the polyaniline or a derivative thereof, for example, polyaniline (produced by Aldrich Chemical Company, Inc.) and polyaniline (emeraldine salt) (produced by Aldrich Chemical Company, Inc.) are available.

As to the polypyrrole or a derivative thereof, for example, polypyrrole (produced by Aldrich Chemical Company, Inc.) is available.

Specific examples of the electrically conductive polymer are illustrated below, but the present invention is not limited thereto. In specific examples, each of x and y represents the number of repeating units. In addition, other examples include the compounds described in International Publication No. WO98/01909.

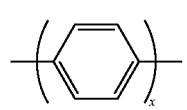

(1)

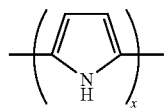

(2)

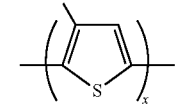

(3)

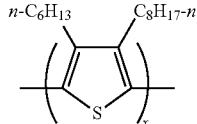

(4)

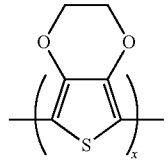

(5)

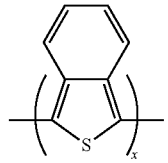

(6)

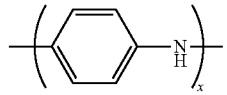

(7)

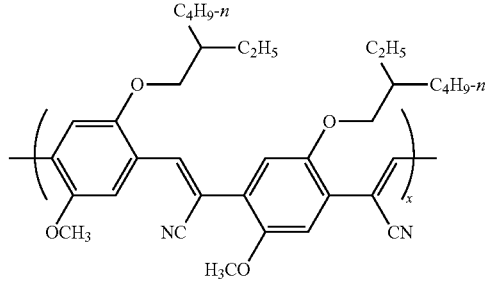

(8)

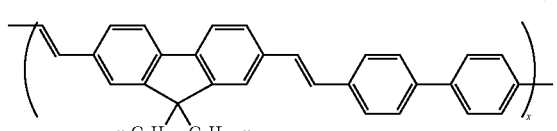

(9)

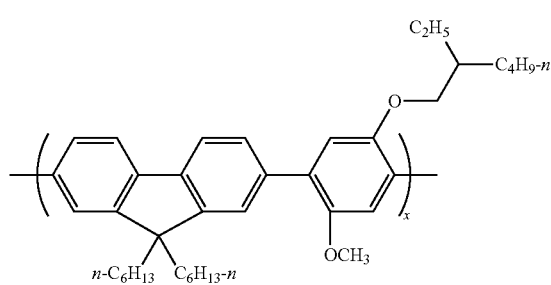

(10)

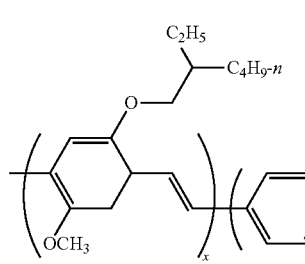

(11)

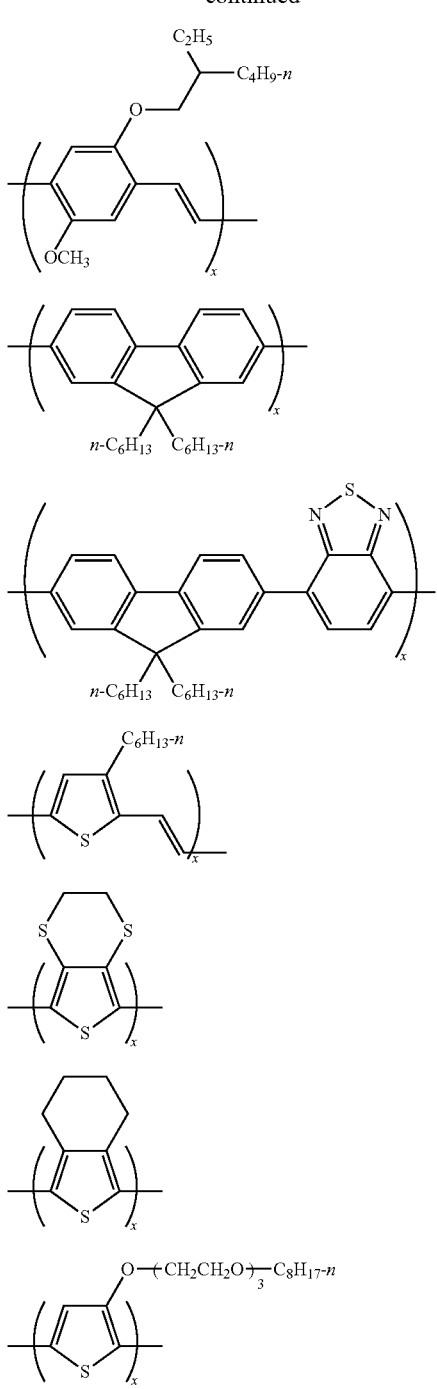

The weight average molecular weight of the electrically conductive polymer for use in the present invention is preferably from 1,000 to 1,000,000, more preferably from 10,000 to 500,000, still more preferably from 10,000 to 100,000. The weight average molecular weight as used herein is a weight average molecular weight in terms of polystyrene as measured by gel permeation chromatography.

(Solubility in Organic Solvent)

In view of coatability and imparting affinity for the component (B), the electrically conductive polymer is preferably soluble in an organic solvent.

More specifically, the electrically conductive polymer for use in the present invention is preferably soluble in an amount of at least 1.0 weight % in an organic solvent having a water content of 5 weight % or less and a relative dielectric constant of 2 to 30.

The term "soluble" as used herein indicates that the polymer is dissolved in a single molecular state or in a state of a plurality of single molecules being associated or is dispersed as particles having a particle diameter of 300 nm or less.

In general, the electrically conductive polymer has high hydrophilicity and conventionally dissolves in a solvent mainly composed of water. In order to solubilize such an electrically conductive polymer in an organic solvent, a method of adding a compound capable of increasing the affinity for an organic solvent (for example, the later-described solubilization aid) to a composition containing the electrically conductive polymer, or a method of adding a dispersant or the like to the organic solvent may be employed. Also, in the case of using an electrically conductive polymer and a polyanion dopant, as described later, a hydrophobing treatment of the polyanion dopant is preferably performed.

Furthermore, there may be also used a method where the electrically conductive polymer is put in a dedoped state (in a state of not using a dopant) to enhance the solubility in an organic solvent and after the formation of a coated film, a dopant is added to develop the electrical conductivity.

In addition, the methods described in the following literatures are also preferably used as the method for enhancing the solubility in an organic solvent.

For example, JP-A-2002-179911 describes a method where a polyaniline composition in a dedoped state is dissolved in an organic solvent and after coating and drying the resulting material on a substrate, electrical conductivity is developed by applying an oxidation and doping treatment with a solution having dissolved or dispersed therein a protonic acid and an oxidant.

Also, International Publication No. 05/035626 describes a method for producing an electrically conductive polyaniline, where at the time of oxidatively polymerizing aniline or a derivative thereof in a mixed layer composed of an aqueous layer and an organic layer in the presence of at least one of a sulfonic acid and a water-insoluble organic polymer compound having a protonic acid group, a molecular weight modifier and, if desired, a phase-transfer catalyst are caused to be present together and thereby, the polymer is stably dispersed in an organic solvent.

For example, alcohols, aromatic hydrocarbons, ethers, ketones and esters are suitable as the organic solvent. Specific examples of these compounds are described below (the relative dielectric constant is shown in the parenthesis).

The alcohols include, for example, a monohydric alcohol and a dihydric alcohol. Of these, the monohydric alcohol is preferably a saturated aliphatic alcohol having a carbon number of 2 to 8. Specific examples of the alcohols include ethyl alcohol (25.7), n-propyl alcohol (21.8), i-propyl alcohol (18.6), n-butyl alcohol (17.1), sec-butyl alcohol (15.5) and tert-butyl alcohol (11.4).

Specific examples of the aromatic hydrocarbons include benzene (2.3), toluene (2.2) and xylene (2.2); specific examples of the ethers include tetrahydrofuran (7.5), ethylene glycol monomethyl ether (16), ethylene glycol monomethyl ether acetate (8), ethylene glycol monoethyl ether (14), ethylene glycol monoethyl ether acetate (8) and ethylene glycol monobutyl ether (9); specific examples of the ketones include acetone (21.5), diethyl ketone (17.0), methyl ethyl ketone (15.5), diacetone alcohol (18.2), methyl isobutyl ketone (13.1) and cyclohexanone (18.3); and specific examples of the esters include methyl acetate (7.0), ethyl acetate (6.0), propyl acetate (5.7) and butyl acetate (5.0).

The electrically conductive polymer is preferably soluble at a concentration of at least 1.0 weight %, more preferably at a concentration of at least from 1.0 to 10.0 weight %, still more preferably at a concentration of at least from 3.0 to 30.0 weight %, in an organic solvent.

In the organic solvent, the electrically conductive polymer may be present as particles. In this case, the average particle size is preferably 300 nm or less, more preferably 200 nm or less, still more preferably 100 nm or less. With the particle size in this range, precipitation of particles in the organic solvent can be suppressed. The lower limit of the particle size is not particularly limited.

(Hydrophobing Treatment)

As described above, in the case of using a polyanion dopant together with the electrically conductive polymer, the composition containing the electrically conductive polymer and the polyanion dopant is preferably subjected to a hydrophobing treatment. By applying a hydrophobing treatment to the composition above, solubility of the electrically conductive polymer in an organic solvent can be increased, and the affinity for the (B) polyfunctional monomer having two or more polymerizable groups can be enhanced. The hydrophobing treatment can be performed by modifying the anion group of the polyanion dopant.

More specifically, a first method for the hydrophobing treatment includes a method of esterifying, etherifying, acetylating, tosylating, tritylating, alkylsilylating or alkylcarbonylating the anion group. Above all, esterification and etherification are preferred. Examples of the method of performing hydrophobization by esterification include a method of chlorinating the anion group of the polyanion dopant with a chlorinating agent and then esterifying it with an alcohol such as methanol and ethanol. The hydrophobization can be also performed by esterifying the anion group with a sulfo group or a carboxy group by using a compound having a hydroxyl group or a glycidyl group and further using a compound having an unsaturated double bonding group.

In the present invention, conventionally known various methods can be used, and these methods are specifically described, for example, in JP-A-2005-314671 and JP-2006-28439.

A second method for the hydrophobing treatment includes a method of hydrophobing the anion group of the polyanion dopant by bonding a basic compound thereto. The basic compound is preferably an amine-based compound, and examples thereof include a primary amine, a secondary amine, a tertiary amine and an aromatic amine. Specific examples thereof include a primary to tertiary amine substituted with an alkyl group having a carbon number of 1 to 20, and an imidazole or pyridine substituted with an alkyl group having a carbon number of 1 to 20. For enhancing the solubility in an organic solvent, the molecular weight of the amine is preferably from 50 to 2,000, more preferably from 70 to 1,000, and most preferably from 80 to 500.

The amount of the amine compound that is a basic hydrophobing agent is preferably from 0.1 to 10.0 molar equivalents, more preferably from 0.5 to 2.0 molar equivalents, still more preferably from 0.85 to 1.25 molar equivalents, based on the anion group of the polyanion dopant not contributing to doping of the electrically conductive polymer. Within this range, the solubility in organic solvent, the electrical conductivity, and the strength of coating film can be satisfied.

For other details of the hydrophobing treatment, the matters described, for example, in JP-A-2008-115215 and JP-A-2008-115216 can be applied.

(Solubilization Agent)

The electrically conductive polymer can be used together with a compound containing a hydrophilic moiety, a hydrophobic moiety and, preferably, an ionizing radiation-curable functional group-containing moiety in the molecule (hereinafter, referred to as a "solubilization agent").

Use of a solubilization aid assists in solubilizing the electrically conductive polymer in an organic solvent having a low water content and furthermore, makes it possible to improve the coated surface shape of a layer formed of the composition of the present invention or increase the strength of the cured film.

The solubilization agent is preferably a copolymer having a hydrophilic moiety, a hydrophobic moiety and an ionizing radiation-curable functional group-containing moiety, more preferably a block or graft copolymer in which these moieties divided into segments. Such a copolymer can be polymerized by living anionic polymerization or living radical polymerization or by using macromonomers having the moieties above.

The solubilization agent is described, for example, in paragraphs [0022] to [0038] of JP-A-2006-176681.

(Preparation Method of Solution Containing Electrically Conductive Polymer)

The electrically conductive polymer can be prepared in the form of a solution by using the organic solvent described above.

The method for preparing an electrically conductive polymer solution includes several methods, but the following three methods are preferred.

The first method is a method of polymerizing an electrically conductive polymer in water in the co-presence of a polyanion dopant, treating the polymer, if desired, by adding the above-described solubilization agent or basic hydrophobing agent, and then replacing the water with an organic solvent. The second method is a method of polymerizing an electrically conductive polymer in water in the co-presence of a polyanion dopant, treating the polymer, if desired, with the above-described solubilization agent or basic hydrophobing agent, evaporating the water to dryness, and adding an organic solvent to solubilize the polymer. The third method is a method of separately preparing a π-conjugated electrically conductive polymer and a polyanion dopant, mixing and dispersing these two members in a solvent to prepare an electrically conductive polymer composition in a doped state, and when the solvent contains water, replacing the water with an organic solvent.

In the methods above, the amount of the solubilization agent used is preferably from 1 to 100 weight %, more preferably from 2 to 70 weight %, and most preferably from 5 to 50 weight %, based on the total amount of the electrically conductive polymer and the polyanion dopant. In the first method, the method for replacing water with an organic solvent is preferably a method of adding and using a solvent having high water miscibility, such as ethanol, isopropyl alcohol and acetone, to make a uniform solution, and then removing the water by ultrafiltration. Also, a method of reducing the water content to a certain extent by using a solvent having high water miscibility, mixing a more hydrophobic solvent, and removing highly volatile components under reduced pressure to prepare a solvent composition may be used. Furthermore, when sufficient hydrophobization is performed using a basic hydrophobing agent, it is also possible to create a separated two-phase system by adding an organic solvent having low miscibility with water and extract the organic electrically conductive polymer into the organic solvent phase from the aqueous phase.

The content of the electron-conducting compound is preferably from 0.1 to 20 weight %, more preferably from 1 to 15 weight %, and most preferably from 1 to 10 weight %, based on the entire solid content of the coating solution for antistatic layer. When the content is 0.1 weight % or more, sufficient antistatic property is obtained, and when the content is 20 weight % or less, the coating film is kept from reduction in the hardness and can have an excellent surface shape.

(B) Polyfunctional Monomer Having Three or More Polymerizable Groups

The antistatic layer-forming composition for use in the present invention contains (B) a polyfunctional monomer having three or more polymerizable groups. The (B) polyfunctional monomer having three or more polymerizable groups can function as a curing agent. Thanks to its combination use with the antistatic agent (the electrically conductive polymer (A)), an antistatic layer excellent in the hardness and antistatic property can be formed. If the (B) polyfunctional monomer having three or more polymerizable groups is not used and only a monomer having two or less polymerizable groups is used, the film is reduced not only in the strength but also in the electrical conductivity. The cause thereof is not clearly known, but this is presumed to result because when a monomer having two or less polymerizable groups is used, cure shrinkage when cured is small due to a low polymerizable group density and the distance between electrically conductive organic compound molecules becomes large.

The polymerizable group contained in the (B) polyfunctional monomer having three or more polymerizable groups is preferably a polymerizable unsaturated group such as (meth)acryloyl group, vinyl group, styryl group and allyl group, more preferably a (meth)acryloyl group or —C(O)OCH=CH$_2$.

Specific examples of the compound having a polymerizable unsaturated bond include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adduct, epoxy (meth)acrylates, urethane (meth)acrylates, and polyester (meth)acrylates.

Examples of the esters of polyhydric alcohol and (meth)acrylic acid include pentaerythritol tetra(meth)acrylate, pentaerythritol tri(meth)acrylate, trimethylolpropane tri(meth)acrylate, Ethylene oxide(EO)-modified trimethylolpropane tri(meth)acrylate, Polyethylene oxide(PO)-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and caprolactone-modified tris(acryloxyethyl)isocyanurate.

As for the polyfunctional acrylate-based compounds having a (meth)acryloyl group, commercially available products may be also used, and examples thereof include KAYARAD DPHA and KAYARAD PET-30, produced by Nippon Kayaku Co., Ltd.; and Viscoat V#360, produced by Osaka Organic Chemical Industry Ltd.

The polyfunctional monomer is described in paragraphs [0114] to [0122] of JP-A-2009-98658, and the same applies to the present invention.

The hardcoat layer-forming composition for use in the present invention preferably contains at least the following (C) and (D):

(C) a polyfunctional monomer having two or more polymerizable groups, and (D) a solvent capable of dissolving or swelling the transparent support.

(C) Polyfunctional Monomer Having Two or More Polymerizable Groups

The hardcoat layer-forming composition for use in the present invention contains (C) a polyfunctional monomer having two or more polymerizable groups. The polyfunctional monomer is preferably a compound having three or more polymerizable groups, and specific examples and preferred ranges thereof are the same as specific examples and preferred ranges of the (B) polyfunctional monomer having three or more polymerizable groups.

Specific examples of the (C) polyfunctional monomer having two or more polymerizable groups include, in addition to specific examples of the (B) polyfunctional monomer having three or more polymerizable groups, 1,4-butanediol di(meth)acrylate, 1,6-hexanediol di(meth)acrylate, neopentyl glycol di(meth)acrylate, ethylene glycol di(meth)acrylate, and triethylene glycol di(meth)acrylate.

(D) Solvent Capable of Dissolving or Swelling the Transparent Support

The hardcoat layer-forming composition for use in the present invention contains (D) a solvent capable of dissolving or swelling the transparent support.

As for the (D) solvent capable of dissolving or swelling the transparent support (substrate), from the standpoint of improving the adherence to the substrate and at the same time, suppressing the interference unevenness, at least one kind of a solvent capable of dissolving or swelling the substrate in a short time is preferably used.

In the case where the substrate is a triacetyl cellulose (TAC), the solvent capable of dissolving or swelling the substrate includes acetone, methyl acetate, butyl acetate, chloroform, methylene chloride, trichloroethane, tetrahydrofuran, methyl ethyl ketone, cyclohexanone, nitromethane, 1,4-dioxane, dioxolane, N-methylpyrrolidone, N,N-dimethylformamide, diisopropyl ether, methyl cellosolve, ethyl cellosolve, butyl cellosolve, and a carbonate-based solvent represented by the following formula (d1):

In formula (d1), each of Ra and Rb independently represents an alkyl group.

Formula (d1) is described below.

In the formula, each of Ra and Rb independently represents an alkyl group and is preferably an alkyl group having a carbon number of 1 to 3. The alkyl group having a carbon number of 1 to 3 includes a methyl group, an ethyl group, an n-propyl group and an isopropyl group.

Specific examples of the solvent represented by formula (d1) include dimethyl carbonate, diethyl carbonate, di-n-propyl carbonate and diisopropyl carbonate, and examples of the asymmetric carbonate include methyl ethyl carbonate, methyl n-propyl carbonate and ethyl n-propyl carbonate.

In particular, for the reason that an excellent ability of suppressing interference unevenness is exerted as a result of dissolving or swelling the substrate, the solvent used when the substrate is TAC is preferably methyl acetate, acetone, methyl ethyl ketone or a carbonate-based solvent represented by formula (d1), more preferably methyl acetate, acetone, dimethyl carbonate or diethyl carbonate.

Also, in the case of using a TAC film as the substrate, streaky coating unevenness or the like attributable to the defective planarity of the TAC film tends to occur sometimes at the wet coating of a hardcoat layer and an antistatic layer, but when at least one kind of a solvent having a boiling point of 85 to 140° C., preferably from 90 to 130° C., is used, streaky coating unevenness or the like attributable to defective planarity tends to be improved, and this is advantageous in view of coating suitability.

In the case where the substrate is polyethylene terephthalate (PET), the solvent capable of dissolving or swelling the substrate includes phenol, chlorobenzene, nitrobenzene, chlorophenol, hexafluoroisopropanol, acetone, methyl acetate, ethyl acetate, butyl acetate, chloroform, methylene chloride, trichloroethane, tetrahydrofuran, methyl ethyl ketone, methyl isobutyl ketone, cyclohexanone, nitromethane, 1,4-dioxane, dioxolane, N-methylpyrrolidone, N,N-dimethylformamide, methanol, ethanol, isopropyl alcohol, butanol, isobutyl alcohol, diisopropyl ether, methyl cellosolve, ethyl cellosolve, and butyl cellosolve.

The solvent used when the substrate is polyethylene terephthalate (PET) is, in particular, suitably phenol, chlorobenzene, nitrobenzene, chlorophenol or hexafluoroisopropanol.

The (D) solvent capable of dissolving or swelling the transparent support is preferably contained in an amount of 20 to 100 weight %, more preferably from 30 to 100 weight %, still more preferably from 50 to 100 weight %, based on all solvents contained in the hardcoat layer-forming composition. When the content is 20 weight % or more, the substrate can be sufficiently dissolved or swelled, and the adherence between the hardcoat layer and the substrate and the effect of improving the interference unevenness can be adequately obtained.

Other components which may be contained in the antistatic layer-forming composition and the hardcoat layer-forming composition are described below.

The antistatic layer-forming composition may further contain the (C) polyfunctional monomer having two or more polymerizable groups.

Also, the hardcoat layer-forming composition may further contain the (B) polyfunctional monomer having three or more polymerizable groups.

(Solvent)

Each of the antistatic layer-forming composition and the hardcoat layer-forming composition may further contain other solvents, in addition to the above-described solvent. The other solvent is selected from the standpoint of, for example, enhancing the drying property or leveling effect at the coating. Examples thereof include alcohols such as methanol, ethanol, isopropyl alcohol and propylene glycol monomethyl ether; ketones such as methyl ethyl ketone, methyl isobutyl ketone and cyclohexanone; esters such as ethyl acetate and butyl acetate; carbonate-based solvents such as dimethyl carbonate and diethyl carbonate; halogenated hydrocarbons; and aromatic hydrocarbons such as toluene and xylene. One of these solvents may be used alone, or two or more thereof may be used in combination.

(E) Alcohol-Based Solvent

The solvent used for the antistatic layer-forming composition preferably contains at least one alcohol-based solvent. By containing an alcohol-based solvent, stability of the electrically conductive organic compound (A) that is relatively hydrophilic can be improved, and surface roughening or surface failure such as point defect is less likely to occur.

The alcohol-based solvent includes, for example, a monohydric alcohol and a polyhydric alcohol. The monohydric alcohol is preferably a saturated aliphatic alcohol having a carbon number of 2 to 8. Specific examples of these alcohols include ethyl alcohol, n-propyl alcohol, i-propyl alcohol, n-butyl alcohol, sec-butyl alcohol and tert-butyl alcohol, and include, as the polyhydric alcohols, ethylene glycol, diethylene glycol, triethylene glycol, propylene glycol, dipropylene glycol, butylene glycol, hexanediol and pentane diol.

Specific examples of the polyhydric alcohols which can be preferably used include ethylene glycol monomethyl ether, ethylene glycol monoethyl ether, ethylene glycol monobutyl ether, propylene glycol monomethyl ether, propylene glycol monoethyl ether, and propylene glycol monobutyl ether.

Content of the alcohol-based solvent is preferably 20 to 80%, more preferably from 30 to 70%, and most preferably from 50 to 70%, in all solvents contained in the antistatic layer-forming composition. When the content is 20% or more, the stability of the electrically conductive organic solvent in the coating solution is enhanced and this is advantageous in that unevenness is not formed on the coating film surface and an increase in haze or generation of a point-like defect is less likely occur. When the content is 80% or less, solubility of the polyfunctional monomer having three or more polymerizable groups, contained in the coating solution, is enhanced and similarly to the above, surface roughening or whitening is advantageously less likely to occur.

(F) Inorganic Oxide Fine Particle

From the standpoint of controlling the refractive index and increasing the hardness of the coating film, the composition for forming the hardcoat layer preferably further contains (F) an inorganic oxide fine particle. The inorganic particle is an oxide of at least one metal selected from zirconium, titanium, aluminum, indium, zinc, tin and antimony, and specific examples thereof include $ZrO_2$, $TiO_2$, $Al_2O_3$, $In_2O_3$, $ZnO$, $SnO_2$, $Sb_2O_3$, ITO and ATO. In addition, magnesium fluoride and the like may be also used. Above all, the inorganic oxide fine particle (F) is preferably a silica fine particle.

The size (primary particle diameter) of the silica fine particle is from 5 nm to less than 100 nm, preferably from 10 to 70 nm, and most preferably from 10 to 50 nm. The average particle diameter of the fine particle can be determined from an electron micrograph. If the particle diameter of the inorganic fine particle is excessively large, fine irregularities are produced on the hardcoat layer surface and the appearance such as denseness of black or the integrated reflectivity may be deteriorated. The silica fine particle may be crystalline or amorphous and may be a monodisperse particle or may be even an aggregate particle as long as the predetermined particle diameter is satisfied. The shape is most preferably spherical, but there is no problem even when the particle has a shape that is not spherical, such as indefinite shape. Also, two or more kinds of silica fine particles differing in the average particle size may be used in combination.

The silica fine particle which can be used in the present invention may be subjected to a surface treatment so as to enhance the dispersibility in the coating solution or increase the film strength, and specific examples and preferred examples of the surface treatment method are the same as those described in paragraphs [0119] to [0147] of JP-A-2007-298974.

Specific preferred examples of the silica fine particle include MiBK-ST, MiBK-SD (both a silica sol having an average particle diameter of 15 nm, produced by Nissan Chemical Industries, Ltd.) and MEK-ST-L (a silica sol having an average particle diameter of 50 nm, produced by Nissan Chemical Industries, Ltd.).

The inorganic oxide fine particle such as silica fine particle is preferably contained in an amount of 5 to 50 weight %, more preferably from 10 to 30 weight %, based on the entire solid content of the hardcoat layer-forming composition.

(G) Thickener

In the optical film of the present invention, two coated layers are simultaneously coated and formed in one coating step and for adjusting the mixing of two layers here, the viscosity of the coating solution is preferably adjusted by using a thickener. The thickener as used herein means a material capable of increasing the viscosity of a liquid when added to the liquid, and the magnitude at which the viscosity of the coating solution is increased by the addition is preferably from 0.05 to 50 cP, more preferably from 0.10 to 30 cP, and most preferably from 0.10 to 20 cP.

Examples of the thickener include, but are not limited to, poly-∈-caprolactone, poly-∈-caprolactonediol, poly-∈-caprolactonetriol, polyvinyl acetate, poly(ethylene adipate), poly(1,4-butylene adipate), poly(1,4-butylene glutarate), poly(1,4-butylene succinate), poly(1,4-butylene terephthalate), poly(ethylene terephthalate), poly(2-methyl-1,3-propylene adipate), poly(2-methyl-1,3-propylene glutarate), poly(neopentyl glycol adipate), poly(neopentyl glycol sebacate), poly(1,3-propylene adipate), poly(1,3-propylene glutarate), polyvinylbutyral, polyvinylformal, polyvinylacetal, polyvinylpropanal, polyvinylhexanal, polyvinylpyrrolidone, polyacrylic acid ester, polymethacrylic acid ester, cellulose acetate, cellulose propionate, and cellulose acetate butyrate.

Other than these compounds, known viscosity adjusting agents and thixotroping agents, such as smectite, tetrasilicic fluorine mica, bentonite, silica, montmorillonite and sodium polyacrylate described in JP-A-8-325491 and ethyl cellulose, polyacrylic acid and organic clay described in JP-A-10-219136, may be used.

The amount of the thickener added is preferably from 0 to 30 weight %, more preferably from 1 to 15 weight %, and most preferably from 2 to 10 weight %, based on the entire solid content of each coating solution. When the amount added is 30 weight %, the strength of the coating film is hardly reduced and this is preferred.

(Urethane Acrylate, Epoxy Acrylate)

In at least either one of the hardcoat layer-forming composition and the antistatic layer-forming composition, at least one of a urethane acrylate and an epoxy acrylate is preferably used as a monomer. In particular, at least either one of the component (B) and the component (C) preferably contains at least one of a urethane acrylate and an epoxy acrylate. By using at least one of a urethane acrylate and an epoxy acrylate, the viscosity of the coating solution can be increased and at the time of simultaneously coating and forming two coated layers of hardcoat layer and antistatic layer, the two layers can be kept from being excessively mixed. This effect is considered to be attributable to the fact that a urethane acrylate or an epoxy acrylate readily forms hydrogen bonding. Above all, a urethane acrylate is preferred.

Specific examples of the urethane acrylate for use in the present invention include, but are not limited to, UA-306H, UA-306T and UA-3061, produced by Kyoeisha Chemical Co., Ltd.; UV-1700B, UV-6300B, UV-7600B, UV-7605B, UV-7640B and UV-7650B, produced by The Nippon Synthetic Chemical Industry Co., Ltd.; U-4HA, β-6HA, UA-100H, U-6LPA, α-15HA, UA-32P and U-324A, produced by Shin-Nakamura Chemical Co., Ltd.; Ebecryl-1290, Ebecryl-1290K and Ebecryl-5129, produced by Daicel-UCB Company Ltd.; and UN-3220HA, UN-3220HB, UN-3220HC and UN-3220HS, produced by Negami Chemical Industrial Co., Ltd.

The epoxy acrylate is synthesized by a reaction of an epoxy group-containing compound and a (meth)acrylic acid, and typical epoxy acrylates are classified, by the epoxy group-containing compound, into a bisphenol A type, a bisphenol S type, a bisphenol F type, an epoxidized oil type, a phenol novolak type, and an alicyclic type. Specific examples thereof include, but are not limited to, an acrylate obtained by reacting an acrylic acid with an adduct of bisphenol A and epichlorohydrin, an acrylate obtained by reacting epichlorohydrin with phenol novolak and then reacting an acrylic acid, an acrylate obtained by reacting an acrylic acid with an adduct of bisphenol S and epichlorohydrin, an acrylate obtained by reacting an acrylic acid with an adduct of bisphenol S and epichlorohydrin, and an acylate obtained by reacting an acrylic acid with an epoxidized soybean oil.

Specific examples of the epoxy acrylate for use in the present invention include, but are not limited to, Ebecryl-605, Ebecryl-645, Ebecryl-648, Ebecryl-1606, Ebecryl-3213, Ebecryl-3416, Ebecryl-3420, Ebecryl-3500, Ebecryl-3608, Ebecryl-3701, Ebecryl-3703 and Ebecryl-3708, produced by DAICEL-CYTEC Company Ltd.; and DA212, DA314 and DA722, produced by Nagase ChemteX Corporation.

The content of the urethane acrylate or epoxy acrylate is preferably from 10 to 100 weight %, more preferably from 20 to 60 weight %, based on the entire solid content of the hardcoat layer-forming composition or antistatic layer-forming composition.

(Monomer/Oligomer Having a Molecular Weight of 600 or More)

At least either one of the hardcoat layer-forming composition and the antistatic layer-forming composition preferably contains at least one member selected from at least either a monofunctional monomer or a monofunctional oligomer each having a molecular weight of 600 or more (sometimes referred to as "monomer/oligomer") and a polyfunctional monomer/oligomer having a molecular weight of 600 or more. In particular, at least either one of the component (B) and the component (C) preferably contains at least one of a polyfunctional monomer having a molecular weight of 600 or more. By using a monomer or oligomer having a molecular weight of 600 or more, the viscosity of the coating solution can be increased and at the time of simultaneously coating and forming two coated layers of hardcoat layer and antistatic layer, the two layers can be kept from being excessively mixed. The molecular weight of the monomer is preferably from 1,000 to 10,000, more preferably from 1500 to 8,000.

The content of the monomer/oligomer having a molecular weight of 600 or more is preferably from 5 to 80 weight %, more preferably from 10 to 50 weight %, based on the entire solid content of the hardcoat layer-forming composition or antistatic layer-forming composition.

(H) Surfactant

It is also preferred to use various surfactants in the antistatic layer-forming composition of the present invention. In general, the surfactant can suppress the thickness unevenness or the like caused by uneven drying due to local distribution of the drying air or improve the surface unevenness of the antistatic layer or repelling of the coated material. Furthermore, the surfactant sometimes advantageously allows the interference unevenness to be less viewable or enhances the dispersibility of the antistatic compound to let higher electrical conductivity be more stably developed.

Specifically, the surfactant is preferably a fluorine-containing surfactant or a silicone-containing surfactant. Also, the surfactant is preferably an oligomer or a polymer more than a low molecular compound.

When a surfactant is added, the surfactant swiftly moves and is unevenly distributed to the surface of the coated liquid film, and the surfactant remains unevenly distributed to the surface after drying, as a result, the surface energy of the antistatic layer to which the surfactant is added decreases by the effect of the surfactant. From the standpoint of preventing thickness non-uniformity, repelling or unevenness of the antistatic layer, the surface energy of the film is preferably lower.

The surface energy ($\gamma s^v$, unit: $mJ/m^2$) of the layer can be experimentally determined using pure water $H_2O$ and methylene iodide $CH_2I_2$ on the layer by referring to D. K. Owens, J. Appl. Polym. Sci., Vol. 13, page 1741 (1969). At this time, assuming that the contact angles for pure water and methylene iodide are $\theta_{H2O}$ and $\theta_{CH2I2}$, respectively, $\gamma s^d$ and $\gamma s^h$ are obtained according to the following simultaneous equations (1) and (2) and from the value ye ($=\gamma s^d+\gamma s^h$) as the sum thereof, the energy-equivalent value (a value obtained by converting the mN/m unit into the mJ/m² unit) of surface tension of the constituent layer is determined and defined as the surface energy. Before the measurement, the sample needs to be subjected to humidity conditioning under predetermined temperature and humidity conditions for a fixed time or more. The temperature here is preferably from 20 to 27° C., the humidity is preferably from 50 to 65 RH %, and the humidity conditioning time is preferably 2 hours or more.

$$1+\cos\theta_{H2O}=2\sqrt{\gamma s^d}(\sqrt{\gamma_{H2O}d}/\gamma_{H2O}v)+2\sqrt{\gamma s^h}(\sqrt{\gamma_{H2O}h}/\gamma_{H2O}v) \quad (1)$$

$$1+\cos\theta_{CH2I2}=2\sqrt{\gamma s^d}(\sqrt{\gamma_{CH2I2}d}/\gamma_{CH2I2}v)+2\sqrt{\gamma s^h}(\sqrt{\gamma_{CH2I2}h}/\gamma_{CH2I2}v) \quad (2)$$

wherein $\gamma_{H2O}d=21.8°$, $\gamma_{H2O}h=51.0°$, $\gamma v_{H2O}=72.8°$, $\gamma_{CH2I2}d=49.5°$, $\gamma_{CH2I2}h=1.3°$ and $\gamma_{CH2I2}v=50.8°$.

The surface energy of the antistatic layer is preferably 45 mJ/m² or less, more preferably from 20 to 45 mJ/m², still more preferably from 20 to 40 mJ/m². By setting the surface energy of the layer to 45 mJ/m² or less, an effect such as thickness uniformization or improved repellency on the antistatic layer can be obtained. However, in the case of further coating an upper layer such as low refractive index layer on the layer to which the surfactant is added, the surfactant is preferably a surfactant capable of dissolving out and moving into the upper layer, and the surface energy of the surfactant-added layer after immersion and washing of the layer with the solvent (e.g., methyl ethyl ketone, methyl isobutyl ketone, toluene, cyclohexanone) of the coating solution for the upper layer is preferably rather higher. The surface energy here is preferably from 35 to 70 mJ/m².

Preferred embodiments and specific examples of the fluorine-containing surfactant are described in paragraphs [0023] to [0080] of JP-A-2007-102206, and the same applies to the present invention.

Preferred examples of the silicone-based compound include those having a substituent at the terminal and/or on the side chain of a compound chain containing a plurality of dimethylsilyloxy units as a repeating unit. The compound chain containing dimethylsilyloxy as a repeating unit may contain a structure unit other than dimethylsilyloxy. The substituents may be the same or different, and a plurality of substituents are preferably present. Preferred examples of the substituent include groups containing a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group.

The molecular weight is not particularly limited but is preferably 100,000 or less, more preferably 50,000 or less, still more preferably from 1,000 to 30,000, and most preferably from 1,000 to 20,000.

The silicon atom content of the silicone-based compound is not particularly limited but is preferably 18.0 weight % or more, more preferably from 25.0 to 37.8 weight %, and most preferably from 30.0 to 37.0 weight %.

Preferred examples of the silicon-based compound include, but are not limited to, "X-22-174DX", "X-22-2426", "X-22-164B", "X22-164C", "X-22-170DX", "X-22-176D" and "X-22-1821" (all trade names) produced by Shin-Etsu Chemical Co., Ltd.; "FM-0725", "FM-7725", "FM-4421", "FM-5521", "FM-6621" and "FM-1121" (all trade names) produced by Chisso Corp.; "DMS-α22", "RMS-033", "RMS-083", "UMS-182", "DMS-H21", "DMS-H31", "HMS-301", "FMS121", "FMS123", "FMS131", "FMS141" and "FMS221" (all trade names) produced by Gelest; "SH200", "DC11PA", "SH28PA", "ST80PA", "ST86PA", "ST97PA", "SH550", "SH710", "L7604", "FZ-2105", "FZ2123", "FZ2162", "FZ-2191", "FZ2203", "FZ-2207", "FZ-3704", "FZ-3736", "FZ-3501", "FZ-3789", "L-77", "L-720", "L-7001", "L-7002", "L-7604", "Y-7006", "SS-2801", "SS-2802", "SS-2803", "SS-2804" and "SS-2805" (all trade names) produced by Dow Corning Toray Co., Ltd.; and "TSF400", "TSF401", "TSF410", "TSF433", "TSF4450" and "TSF4460" (all trade names) produced by Momentive Performance Materials Inc.

The surfactant is preferably contained in an amount of 0.01 to 0.5 weight %, more preferably from 0.01 to 0.3 weight %, based on the entire solid content of the coating composition for forming the antistatic layer.

(Photopolymerization Initiator)

Each of the antistatic layer-forming composition and the hardcoat layer-forming composition for use in the present invention preferably contains a photopolymerization initiator. Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, inorganic complexes, and coumarins. Specific examples, preferred embodiments and commercial products of the photopolymerization initiator are described in paragraphs [0133] to [0151] of JP-A-2009-098658, and these can be suitably used also in the present invention.

Various examples are described also in Saishin UV Koka Gijutsu (Latest UV Curing Technologies), page 159, Technical Information Institute Co., Ltd. (1991), and Kiyomi Kato, Shigaisen Koka System (Ultraviolet Curing System), pp. 65-148, Sogo Gijutsu Center (1989), and these are useful in the present invention.

In the case where the coating composition contains a solvent, the solid content concentration in the coating composition for the hardcoat layer is preferably from 20 to 80 weight %, more preferably from 30 to 70 weight %, and most preferably from 40 to 70 weight %. When the solid content concentration is 80 mss % or less, the absolute amount of the solvent is adequate and therefore, the substrate can be sufficiently dissolved or swelled, whereby the effect of improving the interference unevenness is fully brought out. When the solid content concentration is 20 weight % or more, excessive mixing of two layers is advantageously prevented at the time of simultaneously overlaying the hardcoat layer-forming composition and the antistatic layer-forming composition.

The solid content concentration in the coating composition for the antistatic layer is preferably from 20 to 90 weight %, more preferably from 40 to 80 weight %. When the solid content concentration is 20 weight % or more, excessive mixing of two layers is advantageously prevented at the time of simultaneously overlaying the hardcoat layer-forming composition and the antistatic layer-forming composition.

The optical film of the present invention has a configuration where at least a hardcoat layer/an antistatic layer are stacked in this order on a transparent support. At this time, the two layers of hardcoat layer/antistatic layer are formed by a method of simultaneously coating and forming two coated layers in one coating step.

As the method of simultaneously forming two layers in one coating step, a known method may be used. Specifically, the method described, for example, in paragraphs [0032] to [0056] of JP-A-2007-293302 may be utilized.

[Optical Film]

The hardness of the optical film of the present invention is preferably 2H or more, more preferably 3H or more, in a pencil hardness test with a load of 500 g.

In the optical film of the present invention, the common logarithmic value (LogSR) of the surface resistivity SR (Ω/sq) of the surface on the antistatic layer side with respect to the transparent support is 13 or less, preferably from 5 to 13, more preferably from 6 to 12, still more preferably from 6 to 11. By setting the surface resistivity to the range above, an excellent dust-proof performance can be imparted.

[Antistatic Layer]

The refractive index of the antistatic layer in the present invention is preferably from 1.48 to 1.60, more preferably from 1.48 to 1.57, and most preferably from 1.48 to 1.55. With a refractive index in this range, the interference unevenness can be suppressed and furthermore, when a low refractive index layer is stacked, the reflection tint can be made neutral.

The film thickness of the antistatic layer is preferably from 0.5 to 20 μm, more preferably from 2 to 15 μm, and most preferably from 2 to 10 μm. Within this range, both physical strength and electrical conductivity can be satisfied.

The transmittance of the antistatic layer is preferably 80% or more, more preferably 85% or more, and most preferably 90% or more.

The haze of the antistatic layer is, in the case of not containing a resin particle for imparting an antiglare property, preferably 3% or less, more preferably 2% or less, and most preferably 1% or less. In the case of containing a resin particle to impart an antiglare property, the haze is preferably from 0.1 to 30%, more preferably from 0.1 to 20%.

(Hardcoat Layer)

In the optical film of the present invention, a hardcoat layer is provided for the purpose of imparting the physical strength of the film and controlling the interfacial reflection to suppress the interference unevenness.

From the standpoint of suppressing the interference unevenness, the refractive index of the hardcoat layer in the present invention is preferably from 1.48 to 1.60, more preferably from 1.48 to 1.57, and most preferably from 1.48 to 1.55.

From the standpoint of suppressing the interference unevenness, the refractive index difference Δn between the hardcoat layer and the antistatic layer is preferably from 0 to 0.02, more preferably from 0 to 0.01, and most preferably from 0 to 0.005.

By reducing Δn between the hardcoat layer and the antistatic layer, not only reflection at the layer interface is suppressed to make the interference unevenness less visible but also even when an unexpected disturbance is generated at the layer interface, a surface failure such as clouding hardly occurs.

Here, the refractive index of each of the hardcoat layer and the antistatic layer was calculated in such a way that the composition for forming each layer was coated on a quartz glass to have a dry thickness of 1 μm, dried at 30° C. for 15 seconds and at 60° C. for 60 seconds and irradiated with an ultraviolet ray at an irradiation dose of 100 mJ/cm$^2$ by using an air-cooled metal halide lamp (manufactured by Eye Graphics Co., Ltd.) of 160 W/cm in a state of the oxygen concentration being adjusted to 100 ppm through nitrogen purging, thereby curing and forming the coated layer, thereafter, an oil-based black ink was applied to the back side of this sample to produce a sample prevented from light reflection on the back surface, and a reflection profile was measured using reflection film thickness monitor "FE-3000" (manufactured by Otsuka Electronics Co., Ltd.) and then subjected to fitting.

From the standpoint of imparting sufficiently high durability and impact resistance to the film, the film thickness of the hardcoat layer is from 0.5 to 20 μm, preferably from 2 to 15 μm, more preferably from 2 to 10 μm.

Also, the strength of the hardcoat layer is, in a pencil hardness test, preferably H or more, more preferably 2H or more, and most preferably 3H or more. Furthermore, in the Taber test in accordance with JIS K5400, the abrasion loss of the specimen between before and after the test is preferably smaller.

The hardcoat layer may contain a matting particle having an average particle diameter of 1.0 to 10.0 μm, preferably from 1.5 to 7.0 μm, such as inorganic compound particle or resin particle, for the purpose of imparting internal scattering property.

In the binder of the hardcoat layer, for the purpose of controlling the refractive index of the hardcoat layer, monomers or inorganic particles having various refractive indexes, or both of them may be added. The inorganic particle has an effect of suppressing cure shrinkage due to a crosslinking reaction, in addition to the effect of controlling the refractive index. The binder as referred to in the present invention is a binder inclusive of a polymer produced by the polymerization of, for example, the above-described polyfunctional monomer and/or high refractive index monomer after the formation of the hardcoat layer, and inorganic particles dispersed therein. Use of a silica fine particle as the inorganic particle for controlling the refractive index is preferred from the standpoint of suppressing the tint unevenness due to interference between the support and the hardcoat layer.

(Transparent Support)

The transparent support in the optical film of the present invention is preferably a transparent substrate film. The transparent substrate film includes, for example, a transparent resin film, a transparent resin plate, a transparent resin sheet and a transparent glass and is not particularly limited. Examples of the transparent resin film include a cellulose acylate film (such as cellulose triacetate film (refractive index: 1.48), cellulose diacetate film, cellulose acetate butyrate film and cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film, a (meth)acrylonitrile film, a polyolefin, and a polymer having an alicyclic structure (e.g., norbornene-based resin (ARTON, trade name, produced by JSR Corporation), amorphous polyolefin (ZEONEX, trade name, produced by Nippon Zeon Co., Ltd.)). Among these, triacetyl cellulose, polyethylene terephthalate, and a polymer having an alicyclic structure are preferred, and triacetyl cellulose is more preferred.

A transparent support having a thickness of approximately from 25 to 1,000 μm may be usually used, but the thickness is preferably from 25 to 250 μm, more preferably from 30 to 90 μm.

The surface of the transparent support is preferably smooth and preferably has an average roughness Ra value of 1 μm or less. The average roughness value is preferably from 0.0001 to 0.5 μm, more preferably from 0.001 to 0.1 μm.

The transparent support is described in paragraphs [0163] to [0169] of JPA-2009-98658, and the same applies to the present invention.

(High Refractive Index Layer and Medium Refractive Index Layer)

The optical film of the present invention may further have a high refractive index layer or a medium refractive index layer.

The refractive index of the high refractive index layer is preferably from 1.65 to 2.20, more preferably from 1.70 to 1.80. The refractive index of the medium refractive index layer is adjusted to a value between the refractive index of the low refractive index layer and the refractive index of the high refractive index layer. The refractive index of the medium refractive index layer is preferably from 1.55 to 1.65, more preferably from 1.58 to 1.63.

As for the method to form the high refractive index layer and the medium refractive index layer, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used, but a method by all-wet coating is preferred.

The medium refractive index layer and high refractive index layer are not particularly limited as long as they are a layer having a refractive index in the range above, but those known as a constituent component can be used, and specific examples thereof are described in paragraphs [0074] to [0094] of JP-A-2008-262187.

(Low Refractive Index Layer)

The optical film of the present invention preferably has a low refractive index layer on the antistatic hardcoat layer, directly or through another layer. In this case, the optical film of the present invention can function as an antireflection film.

The refractive index of the low refractive index layer is preferably from 1.30 to 1.51, more preferably from 1.30 to 1.46, still more preferably 1.32 to 1.38. A reflectance in this range is preferred, because the reflectance can be kept low and the film strength can be maintained. As for the method to form the low refractive index layer, similarly to the above, a transparent thin film of inorganic oxide formed by a chemical vapor deposition (CVD) method or a physical vapor deposition (PVD) method, particularly a vacuum deposition method or a sputtering method, which are a kind of physical vapor deposition method, may be used. Among these, a method by all-wet coating using a composition for low refractive index layer is preferred.

The low refractive index layer is not particularly limited as long as it is a layer having a refractive index in the range above, but those known as a constituent component can be used. Specifically, the composition containing a fluorine-containing curable resin and an inorganic fine particle described in JP-A-2007-298974, and the hollow silica fine particle-containing low refractive index coating described in JP-A-2002-317152, JP-A-2003-202406 and JPA-2003-292831 can be suitably used.

[Protective Film for Polarizing Plate]

In the case of using the optical film as a surface protective film of a polarizing film (polarizing plate protective film), the adhesion to the polarizing film mainly composed of a polyvinyl alcohol can be improved by hydrophilizing the transparent support surface opposite the side having the thin-film layer, that is, the surface on the side to be laminated with the polarizing film.

It is also preferred that out of two protective films of the polarizer, the film other than the optical film is an optically compensatory film having an optically compensatory layer containing an optically anisotropic layer. The optically compensatory film (retardation film) can improve the viewing angle characteristics on the liquid crystal display screen.

A known optically compensatory film may be used but from the standpoint of providing a large viewing angle, the optically compensatory film described in JPA-2001-100042 is preferred.

In the case of using the optical film as a surface protective film of a polarizing film (polarizing plate protective film), it is particularly preferred to use a cellulose triacetate film as the transparent support.

The method for producing the polarizing plate protective film in the present invention includes three methods, that is, (1) a method of coating layers constituting the antireflection layer on one surface of a transparent support which is previously subjected to a saponification treatment, (2) a method of coating the antireflection layer on one surface of a transparent support and applying a saponification treatment to the surface to be laminated with a polarizing film or both surfaces, and (3) a method of coating a part of the antireflection layer on one surface of a transparent support, applying a saponification treatment to the surface to be laminated with a polarizing film or both surfaces, and then coating the remaining layers. In the method of (1), the surface to be coated with the antireflection layer is also hydrophilized, and this makes it difficult to ensure the adherence between the transparent support and the antireflection layer. Therefore, the method of (2) is particularly preferred.

[Polarizing Plate]

The polarizing plate of the present invention is described below. The polarizing plate of the present invention is a polarizing plate having a polarizing film and two protective films for protecting both surfaces of the polarizing film, where at least either one of the protective films is the antireflection film of the present invention.

A configuration where the transparent support of the optical film is adhered to the polarizing film, if desired, through an adhesive layer or the like composed of a polyvinyl alcohol and a protective film is also provided on another side of the polarizing film, is preferred. On another protective film surface opposite the polarizing film, a pressure-sensitive adhesive layer may be provided.

By using the optical film of the present invention as a polarizing plate protective film, a polarizing plate excellent in the physical strength, antistatic property and durability can be fabricated.

The polarizing plate of the present invention may also have an optically compensating function. In this case, it is preferred that the optical film is used for the formation of only one surface protective film on either front side or back side out of two surface protective films and the surface protective film on the other side of the polarizing plate opposite the side having the optical film is an optically compensatory film.

By producing a polarizing plate where the optical film of the present invention is used for one polarizing plate protective film and an optically compensatory film having optical anisotropy is used for another protective film of the polarizing film, the bright-room contrast and up/down right/left viewing angle of a liquid crystal display device can be more improved.

Furthermore, the image display device of the present invention is characterized by having the antireflection film or polarizing plate of the present invention on the outermost surface of the display.

EXAMPLES

The present invention is described in greater detail below by referring to Examples, but the scope of the present invention should not be construed as being limited thereto. Unless otherwise indicated, the "parts" and "%" are on the weight basis.

Preparation of Coating Solution

Preparation Example 1-1

Preparation of Aqueous Solution (A) of Electrically Conductive Polymer 8.0 Gram of 3,4-ethylenedioxythiophene was added to 1,000 ml of a 2 weight % aqueous solution of polystyrenesulfonic acid (molecular weight: about 100,000), and these were mixed at 20° C. The resulting mixed solution was added to 100 ml of an oxidation catalyst solution (containing 15 weight % of ammonium persulfate and 4.0 weight % of ferric sulfate), and reaction was allowed to proceed with stirring at 20° C. for 3 hours.

Subsequently, 1,000 ml of ion-exchanged water was added to the obtained reaction solution, and about 1,000 ml of the solution was removed by an ultrafiltration method. This operation was repeating three times.

Thereafter, 100 ml of an aqueous sulfuric acid solution (10 weight %) and 1,000 ml of ion-exchanged water were added to the obtained solution, and about 1,000 ml of the solution was removed by an ultrafiltration method. Furthermore, 1,000 ml of ion-exchanged water was added to the obtained solution, and about 1,000 ml of the solution was removed by an ultrafiltration method. This operation was repeated 5 times, whereby an aqueous solution containing about 1.1 weight % of PEDOT•PSS (poly(3,4-ethylenedioxythiophene).polystyrenesulfonic acid) was obtained. The solid content concentration was adjusted with ion-exchanged water to make a 1.0 weight % aqueous solution. In this way, Solution (A) of electrically conductive polymer was prepared. Solution (A) is an aqueous solution, and the relative dielectric constant of water is 80.

Preparation Example 1-2

Preparation of Acetone Solution (B) of Electrically Conductive Polymer

After adding 200 ml of acetone to 200 ml of Aqueous Solution (A) of PEDOT•PSS prepared in Preparation Example 1, 210 ml of water and acetone were removed by ultrafiltration. This operation was repeated once, and the solid content concentration was adjusted with acetone to prepare a 1.0 weight % water/acetone solution. To 200 ml of this solution, 500 ml of acetone having dissolved therein 2.0 g of trioctylamine was added, and the mixture was stirred with a stirrer for 3 hours. Thereafter, 510 ml of water and acetone were removed by ultrafiltration, and the solid content concentration was adjusted with acetone to make a 1.0 weight % acetone solution. In this way, Solution (B) of electrically conductive polymer was prepared. The water content of this solution was 2 weight %, and the relative dielectric constant of the solvent was 22.7.

Preparation Example 1-3

Preparation of Methyl Ethyl Ketone Solution (C) of Electrically Conductive Polymer Methyl ethyl ketone (300 ml) was added to 200 ml of Solution (B) of PEDOT•PSS prepared in Preparation Example 1-2, and these were mixed. The mixed solution was concentrated at room temperature under reduced pressure until the total amount became 200 ml, and the solid content was adjusted with methyl ethyl ketone to make a 1.0 weight % methyl ethyl ketone solution. In this way, Liquid Dispersion (C) of electrically conductive polymer was prepared. The water content of this solution was 0.05 weight %, and the acetone residual ratio was 1 weight % or less. The relative dielectric constant of the solvent was 15.5, and the content of the electrically conductive polymer was 50 weight % based on the solid contents contained in the solution.

Preparation of Coating Solution for Antistatic Layer

Respective components were mixed as shown in Table 1 below and dissolved in various solvents to prepare Coating Solutions AS1 to AS24 for Antistatic Layer, having a solid content concentration of 60 weight %. In Table 1, the content (weight %) of each component except for the solvent is the content based on the entire solid content of the coating solution for antistatic layer, and the content (weight %) of the solvent is the content of each solvent based on all solvents.

TABLE 1

Coating Solution for Antistatic Layer

Content (as solid content)

| | Electrically Conductive Compound | | Polyfunctional Monomer | | Photopolymerization Initiator | | Surfactant | | Diluting Solvent | |
|---|---|---|---|---|---|---|---|---|---|---|
| | Kind | weight % | Kind | weight % | Kind | weight % | Kind | weight % | Kind | weight % |
| AS1 | Liquid Dispersion C | 3 | DPHA/V#360 | 47/46.9 | Irg. 127 | 3 | FP-1 | 0.1 | IPA/MIBK | 70/30 |
| AS2 | Liquid Dispersion C | 6 | DPHA/V#360 | 45.5/45.4 | Irg. 127 | 3 | FP-1 | 0.1 | IPA/MIBK | 70/30 |
| AS3 | Liquid Dispersion C | 6 | DPHA/V#360 | 45.5/45.4 | Irg. 127 | 3 | FP-1 | 0.1 | IPA/MIBK | 10/90 |
| AS4 | Liquid Dispersion C | 6 | DPHA/V#360 | 45.5/45.4 | Irg. 127 | 3 | FP-1 | 0.1 | IPA/DMC | 70/30 |
| AS5 | Liquid Dispersion C | 6 | DPHA/V#360 | 45.5/45.4 | Irg. 127 | 3 | FP-1 | 0.1 | IPA/methyl acetate | 70/30 |
| AS6 | V2504 | 30 | DPHA/V#360 | 33.5/33.4 | Irg. 127 | 3 | FP-1 | 0.1 | PGME/ethyl acetate | 50/50 |
| AS7 | Liquid Dispersion D | 5 | DPHA/V#360 | 46/45.9 | Irg. 127 | 3 | FP-1 | 0.1 | PGME/IPA | 90/10 |
| AS8 | Liquid Dispersion D | 10 | DPHA/V#360 | 43.5/43.4 | Irg. 127 | 3 | FP-1 | 0.1 | PGME/IPA | 90/10 |
| AS9 | Liquid Dispersion D | 10 | DPHA/V#360 | 43.5/43.4 | Irg. 127 | 3 | FP-1 | 0.1 | PGME/IPA/DMC | 60/10/30 |
| AS10 | Liquid Dispersion D | 10 | DPHA/V#360 | 43.5/43.4 | Irg. 127 | 3 | FP-1 | 0.1 | PGME/IPA/methyl acetate | 60/10/30 |
| AS11 | Liquid Dispersion E | 10 | DPHA/V#360 | 43.5/43.4 | Irg. 127 | 3 | FP-1 | 0.1 | PGME/IPA | 90/10 |
| AS12 | Liquid Dispersion E | 10 | DPHA/V#360 | 43.5/43.4 | Irg. 127 | 3 | FP-1 | 0.1 | PGME/IPA/DMC | 60/10/30 |
| AS13 | Liquid Dispersion E | 10 | DPHA/V#360 | 43.5/43.4 | Irg. 127 | 3 | FP-1 | 0.1 | PGME/IPA/methyl acetate | 60/10/30 |
| AS14 | Liquid Dispersion D | 10 | DPHA/V#360 | 43.5/43.4 | Irg. 127 | 3 | FP-1 | 0.1 | PGME/MIBK | 10/90 |
| AS15 | Liquid Dispersion E | 10 | DPHA/V#360 | 43.5/43.4 | Irg. 127 | 3 | FP-1 | 0.1 | PGME/MIBK | 10/90 |

TABLE 1-continued

Coating Solution for Antistatic Layer

| | Electrically Conductive Compound | | Polyfunctional Monomer | | Photopolymerization Initiator | | Surfactant | | Diluting Solvent | |
|---|---|---|---|---|---|---|---|---|---|---|
| | Kind | weight % | Kind | weight % | Kind | weight % | Kind | weight % | Kind | weight % |
| AS16 | Liquid Dispersion E | 10 | DPHA/V#360 | 43.5/43.4 | Irg. 127 | 3 | FP-1 | 0.1 | PGME/MIBK | 50/50 |
| AS17 | Liquid Dispersion C | 6 | NPGDA | 90.9 | Irg. 127 | 3 | FP-1 | 0.1 | IPA/MIBK | 70/30 |
| AS18 | Liquid Dispersion C | 6 | R167 | 90.9 | Irg. 127 | 3 | FP-1 | 0.1 | IPA/MIBK | 70/30 |
| AS19 | Liquid Dispersion D | 10 | NPGDA | 86.9 | Irg. 127 | 3 | FP-1 | 0.1 | PGME/IPA | 90/10 |
| AS20 | Liquid Dispersion D | 10 | R167 | 86.9 | Irg. 127 | 3 | FP-1 | 0.1 | PGME/IPA | 90/10 |
| AS21 | Liquid Dispersion C | 6 | DPHA/V#360 | 64/26.9 | Irg. 127 | 3 | FP-1 | 0.1 | IPA/MIBK | 70/30 |
| AS22 | Liquid Dispersion D | 10 | DPHA/V#360 | 62/24.9 | Irg. 127 | 3 | FP-1 | 0.1 | PGME/IPA | 90/10 |
| AS23 | Liquid Dispersion C | 6 | DPHA/V#360 | 45.5/45.5 | Irg. 127 | 3 | — | — | IPA/MIBK | 70/30 |
| AS24 | Liquid Dispersion D | 10 | DPHA/V#360 | 43.5/43.5 | Irg. 127 | 3 | — | — | PGME/IPA | 90/10 |

Materials used and abbreviations above are as follows.
DPHA: KAYARAD DPHA, trade name (a mixture of dipentaerythritol pentaacrylate and dipentaerythritol hexaacrylate, produced by Nippon Kayaku Co., Ltd.), molecular weight: 579.
V#360: Viscoat 360, trade name (trimethylolpropane ethylene oxide-modified triacrylate, produced by Osaka Organic Chemical Industry Ltd.), molecular weight: 450.5.
NPGDA: Bifunctional acrylate monomer, KAYARAD NPGDA, produced by Nippon Kayaku Co., Ltd., molecular weight: 212.
R167: Bifunctional acrylate monomer, KAYARAD R167, produced by Nippon Kayaku Co., Ltd., molecular weight: 374.
U15HA: 15-Functional urethane acrylate monomer, U15HA, produced by Shin-Nakamura Chemical Co., Ltd., molecular weight: 2,300.
U6HA: 6-Functional urethane acrylate monomer, U6HA, produced by Shin-Nakamura Chemical Co., Ltd., molecular weight: 1,019.
Irg. 127: Irgacure 127, trade name (produced by Ciba Japan).
V2504: ELCOM V2504, trade name (ITO sol, a liquid dispersion with a solid content of 20 weight %, produced by Catalysts & Chemicals Ind. Co., Ltd.
MEK: Methyl ethyl ketone (produced by Wako Pure Chemical Industries, Ltd.).
IPA: Isopropyl alcohol (produced by Wako Pure Chemical Industries, Ltd.).
DMC: Dimethyl carbonate (produced by Tokyo Chemical Industry Co., Ltd.).
DEC: Diethyl carbonate (produced by Wako Pure Chemical Industries, Ltd.).
PGME: Propylene glycol monomethyl ether
MIBK: Methyl isobutyl ketone
MEK-ST: Organosilica sol (average particle diameter: 15 nm, produced by Nissan Chemical Industries; Ltd.

Liquid Dispersion D: An IP-8 solution having a solid content of 30.7 weight %; the solvent is a mixed solvent of propylene glycol monomethyl ether and isopropyl alcohol in a weight ratio of 30:70.
Liquid Dispersion E: An IP-13 solution having a solid content of 30.7 weight %; the solvent is a mixed solvent of propylene glycol monomethyl ether and isopropyl alcohol in a weight ratio of 30:70.
CAB: Cellulose acylate butyrate (number average molecular weight: about 40,000).
PMMA: Polymethyl methacrylate (number average molecular weight: about 40,000).
"FP-1": A fluorine-containing surfactant represented by the following structural formula:

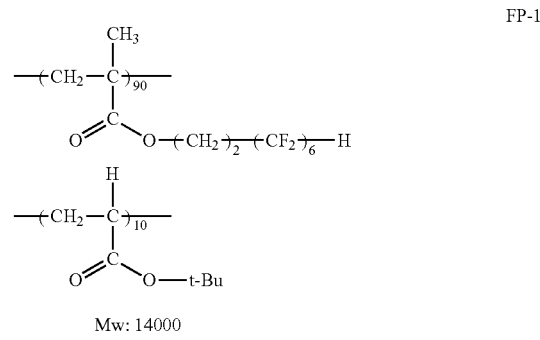

FP-1

Mw: 14000

Preparation of Hardcoat Coating Solution

Respective components were mixed as shown in Table 2 below and dissolved in various solvents to prepare Coating Solutions HC1 to HC12 for Hardcoat Layer, having a solid content concentration of 65 weight %.

TABLE 2

Coating Solution for Hardcoat Layer

| | Polyfunctional Monomer | | Thickener | | Photopolymerization Initiator | | Inorganic Oxide Particle | | Diluting Solvent | |
|---|---|---|---|---|---|---|---|---|---|---|
| | Kind | weight % | Kind | weight % | Kind | weight % | Kind | weight % | Kind | Weight % |
| HC1 | U15HA/V#360 | 46.5/46.5 | CAB | 4 | Irg. 127 | 3 | — | — | IPA/MIBK | 70/30 |
| HC2 | U15HA/V#360 | 46.5/46.5 | CAB | 4 | Irg. 127 | 3 | — | — | IPA/ethyl acetate | 70/30 |
| HC3 | U15HA/V#360 | 46.5/46.5 | CAB | 4 | Irg. 127 | 3 | — | — | IPA/methyl acetate | 70/30 |

TABLE 2-continued

Coating Solution for Hardcoat Layer

Content (as solid content)

| | Polyfunctional Monomer | | Thickener | | Photopolymerization Initiator | | Inorganic Oxide Particle | | Diluting Solvent | |
|---|---|---|---|---|---|---|---|---|---|---|
| | Kind | weight % | Kind | weight % | Kind | weight % | Kind | weight % | Kind | Weight % |
| HC4 | U15HA/V#360 | 46.5/46.5 | CAB | 4 | Irg. 127 | 3 | — | — | IPA/DMC | 70/30 |
| HC5 | U15HA/V#360 | 46.5/46.5 | CAB | 4 | Irg. 127 | 3 | — | — | IPA/DEC | 70/30 |
| HC6 | U15HA/V#360 | 46.5/46.5 | CAB | 4 | Irg. 127 | 3 | — | — | IPA/acetone | 70/30 |
| HC7 | U15HA/V#360 | 46.5/46.5 | CAB | 4 | Irg. 127 | 3 | — | — | IPA/MEK | 20/80 |
| HC8 | U15HA/V#360 | 36.5/36.5 | CAB | 4 | Irg. 127 | 3 | MEK-ST | 20 | IPA/MEK | 20/80 |
| HC9 | U15HA/V#360 | 48.5/48.5 | — | — | Irg. 127 | 3 | — | — | IPA/methyl acetate | 70/30 |
| HC10 | U15HA/V#360 | 46.5/46.5 | PMMA | 4 | Irg. 127 | 3 | — | — | IPA/methyl acetate | 70/30 |
| HC11 | DPHA/V#360 | 46.5/46.5 | CAB | 4 | Irg. 127 | 3 | — | — | IPA/methyl acetate | 70/30 |
| HC12 | U6HA/V#360 | 46.5/46.5 | CAB | 4 | Irg. 127 | 3 | — | — | IPA/methyl acetate | 70/30 |

Example 1

Production of Sample No. 1

On a triacetyl cellulose film (TD80UF, produced by Fujifilm Corp., refractive index: 1.48) having a thickness of 80 μm as a transparent support, Coating Solution AS1 for Antistatic Layer was coated using a gravure coater, dried at 60° C. for about 1 minute and then irradiated with an ultraviolet ray at an illuminance of 400 mW/cm$^2$ and an irradiation dose of 120 mJ/cm$^2$ by using an air-cooled metal halide lamp (manufactured by Eye Graphics Co., Ltd.) of 160 W/cm while purging the system with nitrogen to create an atmosphere having an oxygen concentration of 1.0 vol % or less, thereby curing the coated layer to form an antistatic layer having a thickness of 5 μm. In this way, optical films were produced.

Sample Nos. 2, 6 and 7 were produced in the same manner except for changing the film thickness and the coating solution as shown in Table 3 in Sample No. 1.

Production of Sample No. 3

On a triacetyl cellulose film (TD80UF, produced by Fujifilm Corp., refractive index: 1.48) having a thickness of 80 μm as a transparent support, Coating Solution HC3 for Hardcoat Layer and Coating Solution AS2 for Antistatic Layer were simultaneously coated by means of a composite coater having a one-layer slot die and a one-layer slide to have a dry film thickness of 10 μm and 5 μm, respectively, by appropriately adjusting the wet coated amount of each of Coating Layer HC3 for Hardcoat Layer and Coating Solution AS2 for Antistatic layer while conveying the web at a speed of 30 m/min (simultaneous multilayer coating), then dried at 60° C. for 1 minute, and irradiated with an ultraviolet ray at an illuminance of 400 mW/cm$^2$ and an irradiation dose of 120 mJ/cm$^2$ by using an air-cooled metal halide lamp (manufactured by Eye Graphics Co., Ltd.) of 160 W/cm under purging with nitrogen to create an atmosphere having an oxygen concentration of 0.01 vol % or less, thereby curing the coated layer. In this way, Sample No. 3 having a configuration of transparent support/hardcoat layer/antistatic layer was produced.

Sample Nos. 4, 5 and 8 to 10 were produced in the same manner except for changing the hardcoat coating solution, the coating solution for antistatic layer, and the film thickness as shown in Table 3 in Sample No. 3.

Evaluation of Optical Film

Various characteristics of the optical film were evaluated by the following methods. The results are shown in Table 3.

(1) Measurement of Surface Resistance Value

The sample was left standing under the conditions of 25° C. and 60% RH for 2 hours and then measured using and super-insulation resistance/microammeter, TR8601 (manufactured by Advantest Corp.). The common logarithm (logSR) of the surface resistance value is shown.

(2) Evaluation of Pencil Hardness

As an index of scratch resistance, the pencil hardness evaluation described in JIS K 5400 was performed. The antireflection film was subjected to moisture conditioning at a temperature of 25° C. and a humidity of 60% RH for 2 hours and then evaluated using a pencil for test prescribed in JIS S 6006. In the present invention, the sample with a pencil hardness of 2H or more was judged as passed.

(3) Transmittance

The transmittance (%) of light at 550 nm was measured using an UV/vis spectrometer (Shimadzu U2400). The measurement is preferably 90% or more, more preferably 92% or more.

(4) Evaluation of Surface Roughening

An oil-based black ink was applied to the back side of the sample to produce an A4-size sample prevented from light reflection on the back surface. This sample was observed with an eye under a fluorescent lamp and evaluated according to the following criteria.

A: Roughness of the film surface cannot be recognized even when carefully checked.

AB: Roughness of the film surface is recognized when carefully checked but is not annoying.

B: The film surface is slightly roughened, but this is not annoying.

BC: Roughness of the film surface is recognized at a glance and fairly annoying.

C: Roughness of the film surface is recognized at a glance and very annoying.

The rating of surface roughening is preferably B or higher.

(5) Haze

The haze value (%) was measured in an environment of 25° C. and 60% RH by using a haze meter (NDH2000, manufactured by Nippon Denshoku Industries Co., Ltd. The haze value is preferably 1.0% or less, more preferably 0.5% or less.

(6) Whitening

An oil-based black ink was applied to the back side of the sample to prepare an A4-size sample prevented from light reflection on the back surface. This sample was observed with an eye under sunlight source by entirely blocking the light in a room colored black throughout the circumference and evaluated according to the following criteria.

A: Whitening of the coating film cannot be recognized even when carefully checked.

AB: Slight whitening of the coating film is recognized when carefully checked but is not annoying.

B: The coating film is slightly tinged with white, but this is not annoying.

BC: The coating film surface is tinged with white and this is annoying.

C: Strong clouding of the coating film surface is recognized at a glance and very annoying.

The rating of whitening is preferably B or higher.

(7) Refractive Index the refractive index of each of the hardcoat layer and the antistatic layer was calculated in such a way that the composition for forming each layer was coated on a quartz glass to have a dry thickness of 1 μm, dried at 30° C. for 15 seconds and at 60° C. for 60 seconds and irradiated with an ultraviolet ray at an irradiation dose of 100 mJ/cm$^2$ by using an air-cooled metal halide lamp (manufactured by Eye Graphics Co., Ltd.) of 160 W/cm in a state of the oxygen concentration being adjusted to 100 ppm through nitrogen purging, thereby curing and forming the coated layer, thereafter, an oil-based black ink was applied to the back side of this sample to produce a sample prevented from light reflection on the back surface, and a reflection profile was measured using reflection film thickness monitor "FE-3000" (manufactured by Otsuka Electronics Co., Ltd.) and then subjected to fitting.

(8) Evaluation of Point-Like Defect

An oil-based black ink was applied to the back side (the surface opposite the side where the coated layer was provided) of the sample to produce a sample prevented from light reflection on the back surface. The sample surface was irradiated with light of a desk lamp equipped with a three-wavelength fluorescent lamp (FL20SS•EX-N/18 (manufactured by Matsushita Electric Industrial Co., Ltd.) (a diffuser sheet was laminated to the fluorescent lamp to create diffused light) by entirely blocking light in a room colored black throughout the circumference, and the sample in a 30 m$^2$ portion was observed with an eye to count the number of point-like defects. The number of point defects is preferably from 0 to 10 defects/30 m$^2$, more preferably 0 defect/30 m$^2$.

TABLE 3

| Sample No. | First Layer Coating Solution | Film Thickness (μm) | Refractive Index | Second Layer Coating Solution | Film Thickness (μm) | Refractive Index | Electrically Conductive Polymer Dispersion Content (%) | Amount of Electrically Conductive Polymer Dispersion Coated (g/m$^2$) | Remarks |
|---|---|---|---|---|---|---|---|---|---|
| 1 | — | — | — | AS1 | 5 | 1.51 | 3 | 0.15 | Comparative Example |
| 2 | — | — | — | AS1 | 15 | 1.51 | 3 | 0.45 | Comparative Example |
| 3 | HC3 | 10 | 1.51 | AS2 | 5 | 1.51 | 6 | 0.30 | Example |
| 4 | HC3 | 10 | 1.51 | AS17 | 5 | 1.5 | 6 | 0.30 | Comparative Example |
| 5 | HC3 | 10 | 1.51 | AS18 | 5 | 1.52 | 6 | 0.30 | Comparative Example |
| 6 | — | — | — | AS7 | 5 | 1.57 | 5 | 0.25 | Comparative Example |
| 7 | — | — | — | AS7 | 15 | 1.57 | 5 | 0.75 | Comparative Example |
| 8 | HC3 | 10 | 1.51 | AS8 | 5 | 1.51 | 10 | 0.50 | Example |
| 9 | HC3 | 10 | 1.51 | AS19 | 5 | 1.5 | 10 | 0.50 | Comparative Example |
| 10 | HC3 | 10 | 1.51 | AS20 | 5 | 1.52 | 10 | 0.50 | Comparative Example |

| Sample No. | Surface Resistance logSR | Pencil Hardness | Transmittance (%) | Haze (%) | Surface Roughening | Whitening | Number of Point Defects (defects/30 m$^2$) | Remarks |
|---|---|---|---|---|---|---|---|---|
| 1 | 13.3 | H | 92.1 | 0.3 | A | A | 0 | Comparative Example |
| 2 | 8.2 | 2H | 89.5 | 1.5 | BC | A | 0 | Comparative Example |
| 3 | 7.9 | 3H | 91.4 | 0.3 | A | A | 0 | Example |
| 4 | 9.6 | B | 91.4 | 0.3 | A | A | 0 | Comparative Example |
| 5 | 9.3 | B | 91.4 | 0.3 | A | A | 0 | Comparative Example |
| 6 | 13.7 | H | 92.5 | 0.3 | A | A | 0 | Comparative Example |
| 7 | 10.8 | 2H | 92.5 | 3.4 | BC | B | 0 | Comparative Example |
| 8 | 9.3 | 3H | 92.5 | 0.3 | A | A | 0 | Example |
| 9 | 10.1 | B | 92.5 | 0.3 | A | A | 0 | Comparative Example |
| 10 | 10.7 | B | 92.5 | 0.3 | A | A | 0 | Comparative Example |

It is seen from the results above that in the case of an optical film having at least a hardcoat layer and an antistatic layer in this order on a transparent support, the two layers being simultaneously coated and formed, wherein the antistatic layer is formed of a composition containing (A) an electrically conductive organic compound and (B) a polyfunctional monomer having three or more polymerizable groups and the inorganic oxide fine particle content is from 0% to less than 10% based on the solid content, a film excellent in the antistatic property, hardcoat property and transmittance and free from surface roughening, whitening and point defect is obtained. Also, when a method of simultaneously coating and forming two layers in the coating step is utilized, electrical conductivity can be efficiently developed with a small amount of an electrically conductive polymer, so that the amount of the electrically conductive polymer used as well as the number of coating steps can be reduced and a low cost and high productivity can be realized.

Example 2

Sample Nos. 18, 19 and 23 to 28 were produced in the same manner except that in Sample No. 1 of Example 1, the film thickness and the coating solution were changed as shown in Table 4. Also, Sample Nos. 11 to 17, 20 to 22 and 29 to 48 were produced in the same manner except that in Sample No. 3 of Example 1, the coating solution for hardcoat layer, the coating solution for antistatic layer, and the film thickness were changed as shown in Table 4. Incidentally, in Sample No. 42, the antistatic layer and the hardcoat layer were formed by simultaneously coating respective solutions such that the antistatic layer and the hardcoat layer were stacked in this order on the support.

(Evaluation of Optical Film)

Various properties of the optical film were evaluated by the following method, in addition to the methods of Example 1. The results are shown in Table 4.

(9) Interference Unevenness

An oil-based black ink was applied to the support surface opposite the side where the coated layer was provided, to produce an A4-size sample prevented from light reflection on the back surface. The sample surface was irradiated with light of a desk lamp equipped with a three-wavelength fluorescent lamp (FL20SS•EX-N/18 (manufactured by Matsushita Electric Industrial Co., Ltd.)) (a diffuser sheet was laminated to the fluorescent lamp to create diffused light) by entirely blocking light in a room colored black throughout the circumference so as to let the level of interference unevenness of the sample be very clearly observed, and the interference unevenness observed here was evaluated with an eye.

A: Unevenness cannot be recognized even when carefully checked.

AB: Unevenness is visually recognized when carefully checked but is not annoying.

B: Weak unevenness is recognized but is not annoying.

BC: Unevenness is visually recognized at a glance and annoying.

C: Strong unevenness is visually recognized at a glance and very annoying.

The rating of interference unevenness is preferably "B" or higher.

TABLE 4

| Sample No. | First Layer | | | Second Layer | | | Refractive Index Difference Between Hardcoat Layer and Antistatic Layer | Surface Resistance logSR |
|---|---|---|---|---|---|---|---|---|
| | Coating Solution | Thickness (μm) | Refractive Index | Coating Solution | Thickness (μm) | Refractive Index | | |
| 11 | HC1 | 10 | 1.51 | AS2 | 5 | 1.51 | 0.00 | 7.9 |
| 12 | HC2 | 10 | 1.51 | AS2 | 5 | 1.51 | 0.00 | 7.9 |
| 13 | HC3 | 10 | 1.51 | AS2 | 5 | 1.51 | 0.00 | 7.9 |
| 14 | HC4 | 10 | 1.51 | AS2 | 5 | 1.51 | 0.00 | 7.9 |
| 15 | HC5 | 10 | 1.51 | AS2 | 5 | 1.51 | 0.00 | 7.9 |
| 16 | HC6 | 10 | 1.51 | AS2 | 5 | 1.51 | 0.00 | 7.9 |
| 17 | HC3 | 10 | 1.51 | AS3 | 5 | 1.51 | 0.00 | 7.9 |
| 18 | — | — | — | AS4 | 5 | 1.51 | — | 8.5 |
| 19 | — | — | — | AS5 | 5 | 1.51 | — | 8.1 |
| 20 | HC3 | 10 | 1.51 | AS6 | 2 | 1.57 | 0.06 | 8.9 |
| 21 | HC7 | 10 | 1.51 | AS2 | 5 | 1.51 | 0.00 | 7.9 |
| 22 | HC8 | 10 | 1.49 | AS2 | 5 | 1.51 | 0.02 | 7.9 |
| 23 | — | — | — | AS8 | 5 | 1.51 | — | 9.3 |
| 24 | — | — | — | AS9 | 5 | 1.51 | — | 9.5 |
| 25 | — | — | — | AS10 | 5 | 1.51 | — | 9.5 |
| 26 | — | — | — | AS11 | 5 | 1.51 | — | 9.4 |
| 27 | — | — | — | AS12 | 5 | 1.51 | — | 9.2 |
| 28 | — | — | — | AS13 | 5 | 1.51 | — | 9.1 |
| 29 | HC1 | 10 | 1.51 | AS8 | 5 | 1.51 | 0.00 | 9.3 |
| 30 | HC2 | 10 | 1.51 | AS8 | 5 | 1.51 | 0.00 | 9.3 |
| 31 | HC3 | 10 | 1.51 | AS8 | 5 | 1.51 | 0.00 | 9.3 |
| 32 | HC4 | 10 | 1.51 | AS8 | 5 | 1.51 | 0.00 | 9.3 |
| 33 | HC5 | 10 | 1.51 | AS8 | 5 | 1.51 | 0.00 | 9.3 |
| 34 | HC6 | 10 | 1.51 | AS8 | 5 | 1.51 | 0.00 | 9.3 |
| 35 | HC3 | 10 | 1.51 | AS14 | 5 | 1.51 | 0.00 | 9.3 |
| 36 | HC3 | 10 | 1.51 | AS15 | 5 | 1.51 | 0.00 | 9.3 |
| 37 | HC3 | 10 | 1.51 | AS16 | 5 | 1.51 | 0.00 | 9.3 |
| 38 | HC7 | 10 | 1.51 | AS8 | 5 | 1.51 | 0.00 | 9.3 |
| 39 | HC8 | 10 | 1.49 | AS8 | 5 | 1.51 | 0.02 | 9.3 |
| 40 | HC8 | 10 | 1.49 | AS21 | 5 | 1.52 | 0.03 | 7.9 |

TABLE 4-continued

| | | | | | | | | |
|---|---|---|---|---|---|---|---|---|
| 41 | HC8 | 10 | 1.49 | AS22 | 5 | 1.52 | 0.03 | 9.3 |
| 42 | AS3 | 5 | 1.51 | HC3 | 10 | 1.51 | 0.00 | 13.8 |
| 43 | HC9 | 10 | 1.51 | AS2 | 5 | 1.51 | 0.00 | 9.4 |
| 44 | HC10 | 10 | 1.51 | AS2 | 5 | 1.51 | 0.00 | 7.9 |
| 45 | HC11 | 10 | 1.51 | AS2 | 5 | 1.51 | 0.00 | 9.4 |
| 46 | HC12 | 10 | 1.51 | AS2 | 5 | 1.51 | 0.00 | 8.3 |
| 47 | HC3 | 10 | 1.51 | AS23 | 5 | 1.51 | 0.00 | 8.5 |
| 48 | HC3 | 10 | 1.51 | AS24 | 5 | 1.51 | 0.00 | 10.2 |

| Sample No. | Pencil Hardness | Interference Unevenness | Transmittance (%) | Haze (%) | Surface Roughening | Whitening | Number of Point Defects (/30 m²) | Remarks |
|---|---|---|---|---|---|---|---|---|
| 11 | 3H | BC | 91.4 | 0.3 | A | A | 0 | Example |
| 12 | 3H | BC | 91.4 | 0.3 | A | A | 0 | Example |
| 13 | 3H | A | 91.4 | 0.3 | A | A | 0 | Example |
| 14 | 3H | A | 91.4 | 0.3 | A | A | 0 | Example |
| 15 | 3H | A | 91.4 | 0.3 | A | A | 0 | Example |
| 16 | 3H | A | 91.4 | 0.3 | A | A | 0 | Example |
| 17 | 3H | A | 91.4 | 0.3 | B | A | 0 | Example |
| 18 | H | AB | 91.4 | 1.2 | BC | B | 130 | Comparative Example |
| 19 | H | AB | 91.4 | 1.4 | BC | B | 130 | Comparative Example |
| 20 | 3H | BC | 88.5 | 0.3 | A | BC | 25 | Comparative Example |
| 21 | 3H | B | 91.4 | 0.3 | A | A | 0 | Example |
| 22 | 3H | A | 91.4 | 0.3 | A | A | 0 | Example |
| 23 | H | C | 92.8 | 0.2 | A | A | 0 | Comparative Example |
| 24 | HB | AB | 92.8 | 2.5 | C | BC | 90 | Comparative Example |
| 25 | HB | AB | 92.8 | 3.1 | C | BC | 130 | Comparative Example |
| 26 | H | C | 92.6 | 0.2 | A | A | 0 | Comparative Example |
| 27 | HB | AB | 92.6 | 3.5 | C | BC | 130 | Comparative Example |
| 28 | HB | AB | 92.6 | 3.1 | C | BC | 130 | Comparative Example |
| 29 | 3H | BC | 92.5 | 0.3 | A | A | 0 | Example |
| 30 | 3H | BC | 92.5 | 0.3 | A | A | 0 | Example |
| 31 | 3H | A | 92.5 | 0.3 | A | A | 0 | Example |
| 32 | 3H | A | 92.5 | 0.3 | A | A | 0 | Example |
| 33 | 3H | A | 92.5 | 0.3 | A | A | 0 | Example |
| 34 | 3H | A | 92.5 | 0.3 | A | A | 0 | Example |
| 35 | 3H | A | 92.5 | 0.8 | B | B | 0 | Example |
| 36 | 3H | A | 92.5 | 0.9 | B | B | 0 | Example |
| 37 | 3H | A | 92.5 | 0.3 | A | A | 0 | Example |
| 38 | 3H | B | 92.5 | 0.3 | A | A | 0 | Example |
| 39 | 3H | A | 92.5 | 0.3 | A | A | 0 | Example |
| 40 | 3H | B | 91.4 | 0.3 | A | A | 0 | Example |
| 41 | 3H | B | 92.5 | 0.3 | A | A | 0 | Example |
| 42 | 3H | C | 91.4 | 0.3 | A | A | 0 | Comparative Example |
| 43 | 3H | A | 90.5 | 1.2 | AB | AB | 0 | Example |
| 44 | 3H | A | 91.4 | 0.3 | A | A | 0 | Example |
| 45 | 3H | A | 90.5 | 1.4 | B | A | 0 | Example |
| 46 | 3H | A | 90.5 | 0.3 | AB | A | 0 | Example |
| 47 | 3H | AB | 91.4 | 0.3 | AB | A | 0 | Example |
| 48 | 3H | AB | 92.5 | 0.3 | AB | A | 0 | Example |

It is seen from the results above that in the case of an optical film having at least a hardcoat layer and an antistatic layer in this order on a transparent support, the two layers being simultaneously coated and formed, wherein the antistatic layer is formed of a composition containing (A) an electrically conductive organic compound and (B) a polyfunctional monomer having three or more polymerizable groups and the inorganic oxide fine particle content is from 0% to less than 10% based on the solid content and wherein the kind and amount of the solvent in the compositions for hardcoat layer formation and antistatic layer formation and the refractive index of each layer are selected to fall in the scope of the present invention, an optical film satisfying of all of the above-described performances and the interference unevenness performance is obtained.

Example 3

Preparation of Liquid Dispersion (F) of Hollow Silica Particle

20 Parts by weight of acryloyloxypropyltrimethoxysilane and 1.5 parts by weight of diisopropoxyaluminum ethyl acetate were added to 500 parts by weight of a fine particle sol of hollow silica particle (isopropyl alcohol silica sol, CS60-

IPA, produced by Catalysts & Chemicals Ind. Co., Ltd., average particle diameter: 60 nm, thickness of shell: 10 nm, silica concentration: 20 weight %, refractive index of silica particle: 1.31), and these were mixed. Subsequently, 9 parts by weight of ion-exchanged water was added thereto, and the reaction was allowed to proceed at 60° C. for 8 hours. The reaction solution was cooled to room temperature, and 1.8 parts by weight of acetyl acetone was added to obtain Liquid Dispersion (E). Thereafter, solvent replacement by reduced-pressure distillation was performed under a pressure of 30 Torr while adding cyclohexanone to keep the silica content almost constant, and finally the concentration was adjusted to obtain Liquid Dispersion (F) having a solid content concentration of 18.2 weight %. The amount of IPA remaining in the obtained liquid dispersion was analyzed by gas chromatography and found to be 0.5% or less.

Preparation of Coating Solution for Low Refractive Index Layer

Respective components were mixed as shown in Table 5, and the mixture was dissolved in methyl ethyl ketone to produce a coating solutions for low refractive index layer having a solid content of 5 weight %. In Table 5, the amount of each component is in unit of "parts by weight".

TABLE 5

| Coating Solution | Content (solid content) | | | | | | | Liquid Dispersion F |
|---|---|---|---|---|---|---|---|---|
| | Binder | | Polymerization Initiator | | | | | |
| No. | Kind | Amount | Kind | Amount | Kind | Amount | RMS-033 | |
| Ln1 | P-1 | 28 | DPHA | 10 | Irg. 127 | 3 | 4 | 55 |
| Ln2 | DPHA | 38 | — | 0 | Irg. 127 | 3 | 4 | 55 |

Abbreviations in the Table above are as follows.
"P-1": Fluorine-Containing Copolymer ∈-3 (weight average molecular weight: about 50,000) described in JP-A-2004-45462
DPHA: A mixture of dipentaerythritol pentaacrylate and dipentaerythritol hexaacrylate, produced by Nippon Kayaku Co., Ltd.
Irg. 127: Irgacure 127, polymerization initiator (produced by Ciba Japan)
RMS-033: Methacryloxy-modified silicone (produced by Gelest)

Production of Low Refractive Index Layer

The coating solution for low refractive index layer was coated as shown in Table 6 by using a gravure coater on Sample Nos. 3, 8 and 31 produced above. The drying conditions of the low refractive index layer were 60° C. and 60 seconds, and the ultraviolet curing conditions were such that an air-cooled metal halide lamp (manufactured by Eye Graphics Co., Ltd.) of 240 W/cm was used at an illuminance of 600 mW/cm$^2$ and an irradiation dose of 600 mJ/cm$^2$ while purging the system with nitrogen to give an atmosphere having an oxygen concentration of 0.01 vol % or less. In this way, an optical film (antireflection film) in which a low refractive index layer was formed on the antistatic layer was produced (Sample Nos. 49 to 52).

Evaluation of Optical Film

Various characteristics of the optical film were evaluated by the methods described in Examples 1 and 2 and the following method. The results are shown in Table 6.
(10) Integrated Reflectance, Reflection Tint
The back surface of the optical film was treated with black ink to provide a state of the reflection on the back surface being eliminated. The front surface of the optical film was loaded to an integrating sphere of a spectrophotometer V-550 (manufactured by JASCO Corporation), and the reflectance (integrated reflectance) was measured in the wavelength region of 380 to 780 nm. The average reflectance at 450 to 650 nm was calculated, and the antireflection property was evaluated. Also, from the measurement results, the reflection tint under D65 light source was calculated as a* and b* values.

TABLE 6

| Sample No. | Hardcoat Layer | | | Antistatic Layer | | | Low Refractive Index Layer | | | Integrated Reflectance | Reflection Tint a*/b* | Remarks |
|---|---|---|---|---|---|---|---|---|---|---|---|---|
| | Coating Solution | Thickness (μm) | Refractive Index | Coating Solution | Thickness (μm) | Refractive Index | Coating Solution | Thickness (μm) | | | | |
| 49 | HC3 | 10 | 1.51 | AS2 | 5 | 1.51 | Ln1 | 95 | | 1.6% | 2.5/−0.8 | Example |
| 50 | HC3 | 10 | 1.51 | AS6 | 2 | 1.57 | Ln1 | 95 | | 1.3% | 4.3/−1.7 | Comparative Example |
| 51 | HC3 | 10 | 1.51 | AS8 | 5 | 1.51 | Ln1 | 95 | | 1.6% | 2.5/−0.8 | Example |
| 52 | HC3 | 10 | 1.51 | AS8 | 5 | 1.51 | Ln2 | 95 | | 1.9% | 1.9/−1.0 | Example |

| Sample No. | Surface Resistance logSR | Pencil Hardness | Interference Unevenness | Transmittance (%) | Haze (%) | Surface Roughening | Whitening | Number of Point Defects (/30 m$^2$) | Remarks |
|---|---|---|---|---|---|---|---|---|---|
| 49 | 8.3 | 3H | A | 92.3 | 0.3 | A | A | 0 | Example |
| 50 | 9.4 | 3H | C | 89.7 | 0.3 | A | BC | 25 | Comparative Example |
| 51 | 9.8 | 3H | A | 93.5 | 0.3 | A | A | 0 | Example |
| 52 | 9.8 | 3H | A | 93.5 | 0.3 | A | A | 0 | Example |

It is seen from the results above that an antireflection film excellent in the antireflection performance is obtained by forming a low refractive index on the optical film produced in Example 2. At this time, when a metal oxide fine particle is used as an electrically conductive compound in the antistatic layer, the refractive index of the layer is increased to cause intensification of reflection tint, and this is no good.

Example 4

Evaluation in Liquid Crystal Display Device

Production of Polarizing Plate

Both surfaces of a polarizer produced by adsorbing iodine to a polyvinyl alcohol and stretching it were protected by attaching a triacetyl cellulose film having a thickness of 80 μm (TAC-TD80U, produced by Fujifilm Corp.) which had been dipped in an aqueous 1.5 mol/L NaOH solution at 55° C. for 2 minutes, then neutralized and washed, and the optical film (saponified) of Sample Nos. 1 to 52.

Fabrication of Liquid Crystal Display Device

The polarizing plate and the retardation film provided in a VA-type liquid crystal display device (LC-37GS10, manufactured by Sharp Corp.) were removed, and the polarizing plate produced above was instead laminated by arranging its transmission axis to agree with that of the polarizing plate originally laminated to the commercial product, whereby liquid crystal display devices having the optical film of Examples and Comparative Example were fabricated. Incidentally, the optical film was laminated to lie on the viewing side.

The thus-produced polarizing plate and image display device each with the optical film of Examples, similarly to respective optical films laminated, were excellent in the hardcoat property, transparency and antistatic property and exhibited good performance in terms of interference unevenness and surface shape, as compared with Comparative Examples. Also, in the polarizing plate and image display device each with the optical film having stacked thereon a low refractive index, the disturbing reflection of background was significantly reduced, and the display quality was remarkably high.

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A method for producing an optical film having a transparent support having thereon at least a hardcoat layer and an antistatic layer in this order, with the common logarithmic value (LogSR) of the surface resistivity SR (Ω/sq) on the antistatic layer side with respect to said transparent support being 13 or less, comprising:
    simultaneously coating:
        an antistatic layer-forming composition containing at least (A) an electrically conductive organic compound and (B) a polyfunctional monomer having three or more polymerizable groups and having an inorganic oxide fine particle content of less than 10 weight % based on the entire solid content; and
        a hardcoat layer-forming composition,
    wherein the hardcoat layer-forming composition comprises at least (C) a polyfunctional monomer having two or more polymerizable groups and (D) a solvent capable of dissolving or swelling the transparent support, and
    wherein the composition for forming the antistatic layer further contains (E) an alcohol-based solvent in a ratio of 20 to 80 weight % based on all solvents contained in the composition for forming the antistatic layer.

2. The method for producing an optical film as claimed in claim 1,
    wherein Δn is from 0 to 0.02, and
    Δn represents a refractive index difference between the hardcoat layer and the antistatic layer.

3. The method for producing an optical film as claimed in claim 1,
    wherein the (D) solvent capable of dissolving or swelling the transparent support is at least one selected from the group consisting of methyl ethyl ketone, acetone, methyl acetate, and a carbonate solvent represented by the following formula (d1):

(d1)

wherein each of Ra and Rb independently represents an alkyl group.

4. The method for producing an optical film as claimed in claim 1,
    wherein the (D) solvent capable of dissolving or swelling the transparent support is at least one selected from the group consisting of acetone, methyl acetate, dimethyl carbonate and diethyl carbonate.

5. The method for producing an optical film as claimed in claim 1,
    wherein a content of the (D) solvent capable of dissolving or swelling the transparent support is 20 to 100 weight % based on all solvents contained in the composition for forming said hardcoat layer.

6. The method for producing an optical film as claimed in claim 1,
    wherein the composition for forming the hardcoat layer further contains (F) an inorganic oxide fine particle.

7. The method for producing an optical film as claimed in claim 6,
    wherein the (F) inorganic oxide fine particle is a silica fine particle.

8. The method for producing an optical film as claimed in claim 1,
    wherein at least either one of the composition for forming the hardcoat layer and the composition for forming the antistatic layer further contains (G) a thickener.

9. The method for producing an optical film as claimed in claim 1,
    wherein at least either one of the (B) and (C) contains at least one of an urethane acrylate and an epoxy acrylate.

10. The method for producing an optical film as claimed in claim 1,
    wherein at least either one of the (B) and (C) contains at least one of a polyfunctional monomer having a molecular weight of 600 or more.

11. The method for producing an optical film as claimed in claim 1,
    wherein the composition for forming the antistatic layer further contains a fluorine-containing surfactant or a silicone-containing surfactant.

* * * * *